(12) United States Patent
Ramakrishnan et al.

(10) Patent No.: US 12,455,181 B2
(45) Date of Patent: Oct. 28, 2025

(54) MEASUREMENT OF BULK FLOW VELOCITY AND MIXTURE SOUND SPEED USING AN ARRAY OF DYNAMIC PRESSURE SENSORS

(71) Applicant: ARAMCO SERVICES COMPANY, Houston, TX (US)

(72) Inventors: Vijay Ramakrishnan, Houston, TX (US); Alejandro Vera, Houston, TX (US); Muhammad Arsalan, Dhahran (SA); Sakethraman Mahalingam, Aberdeen (GB)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 322 days.

(21) Appl. No.: 18/306,013

(22) Filed: Apr. 24, 2023

(65) Prior Publication Data

US 2024/0353248 A1 Oct. 24, 2024

(51) Int. Cl.
  *G01F 1/74* (2006.01)
  *G01F 1/7082* (2022.01)
  *G01N 29/024* (2006.01)

(52) U.S. Cl.
  CPC .............. *G01F 1/74* (2013.01); *G01F 1/7082* (2013.01); *G01N 29/024* (2013.01); *G01N 2291/02836* (2013.01)

(58) Field of Classification Search
  CPC . G01F 1/74; G01F 1/7082; G01F 1/34; G01F 1/712; G01N 29/024; G01N 2291/02836
  See application file for complete search history.

(56) References Cited

U.S. PATENT DOCUMENTS

| 3,521,492 A | 7/1970 | Baltakis |
| 5,454,270 A | 10/1995 | Brown et al. |

(Continued)

FOREIGN PATENT DOCUMENTS

| CA | 3167406 A1 | 9/2021 |
| CN | 110108410 A | 8/2019 |

(Continued)

OTHER PUBLICATIONS

N. Glen et al., "Measurement Challenges for Carbon Capture and Storage", Measurement + Control, Apr. 2011, vol. 44, No. 3, pp. 81-85 (5 pages).

(Continued)

*Primary Examiner* — Tarun Sinha
(74) *Attorney, Agent, or Firm* — Osha Bergman Watanabe & Burton LLP

(57) ABSTRACT

A method for determining a bulk velocity and a mixture speed of sound of a multi-phase fluid flowing in a pipe of a pipeline. The method includes the steps: obtaining a plurality of pressure signals from a plurality of pressure sensors, where each pressure sensor in the plurality of pressure sensors includes a diaphragm for sensing pressure, where the diaphragm of each pressure sensor is aligned with an inner wall of the pipe such that each pressure sensor is flush-mounted on the inner wall of the pipe; determining, using the plurality of pressure signals, a first time-of-flight of one or more flow eddies; determining, using the plurality of pressure signals, a second time-of-flight of one or more sound waves; determining, using the first time-of-flight, the bulk velocity of the multi-phase fluid; and determining, using the bulk velocity and the second time-of-flight, the mixture speed of sound of the multi-phase fluid.

17 Claims, 15 Drawing Sheets

(56) References Cited

U.S. PATENT DOCUMENTS

| | | | |
|---|---|---|---|
| 5,745,611 A | 4/1998 | Komachiya et al. | |
| 6,601,458 B1* | 8/2003 | Gysling | G01F 1/74 73/861.27 |
| 7,171,315 B2 | 1/2007 | Loose | |
| 7,281,415 B2 | 10/2007 | Johansen | |
| 7,328,624 B2 | 2/2008 | Gysling et al. | |
| 7,430,918 B2 | 10/2008 | Selvan et al. | |
| 8,245,575 B2 | 8/2012 | Chiou et al. | |
| 9,476,742 B2 | 10/2016 | Camilleri | |
| 9,500,073 B2 | 11/2016 | Xiao et al. | |
| 9,714,568 B2 | 7/2017 | Rendusara et al. | |
| 9,982,519 B2 | 5/2018 | Melo | |
| 10,260,919 B2 | 4/2019 | Dietz et al. | |
| 10,473,501 B2* | 11/2019 | Parry | G01F 7/00 |
| 10,480,312 B2 | 11/2019 | Xiao et al. | |
| 10,876,393 B2 | 12/2020 | Rendusara et al. | |
| 11,066,921 B1 | 7/2021 | Brown et al. | |
| 11,215,183 B2 | 1/2022 | Brown et al. | |
| 11,220,904 B2 | 1/2022 | Brown et al. | |
| 11,346,161 B2 | 5/2022 | Albukhari et al. | |
| 11,428,560 B2 | 8/2022 | Fjalestad et al. | |
| 11,650,089 B2 | 5/2023 | Gandarillas et al. | |
| 2002/0129662 A1 | 9/2002 | Gysling et al. | |
| 2004/0210404 A1 | 10/2004 | Gysling et al. | |
| 2005/0005712 A1 | 1/2005 | Gysling et al. | |
| 2005/0125170 A1 | 6/2005 | Gysling et al. | |
| 2007/0006640 A1 | 1/2007 | Gysling | |
| 2007/0027638 A1* | 2/2007 | Fernald | G01F 1/74 702/25 |
| 2007/0151365 A1 | 7/2007 | Gysling et al. | |
| 2009/0223662 A1 | 9/2009 | Shaw et al. | |
| 2009/0277628 A1 | 11/2009 | Watson et al. | |
| 2013/0175030 A1 | 7/2013 | Ige et al. | |
| 2013/0272898 A1 | 10/2013 | Toh et al. | |
| 2014/0012507 A1 | 1/2014 | Trehan et al. | |
| 2014/0076547 A1* | 3/2014 | Unalmis | G01F 1/74 166/250.01 |
| 2014/0278154 A1 | 9/2014 | McGill, Sr. | |
| 2016/0313160 A1 | 10/2016 | Ueberschlag et al. | |
| 2017/0058664 A1 | 3/2017 | Xiao et al. | |
| 2018/0231498 A1 | 8/2018 | Amir et al. | |
| 2019/0326906 A1 | 10/2019 | Camacho Cardenas et al. | |
| 2019/0330971 A1 | 10/2019 | Xiao et al. | |
| 2021/0010841 A1 | 1/2021 | Gandarillas et al. | |
| 2021/0172443 A1 | 6/2021 | Brown et al. | |
| 2021/0293140 A1 | 9/2021 | Brown et al. | |
| 2021/0302405 A1 | 9/2021 | Al Shahri et al. | |
| 2021/0340869 A1 | 11/2021 | Syresin et al. | |
| 2022/0026248 A1 | 1/2022 | Xu et al. | |
| 2024/0353245 A1 | 10/2024 | Ramakrishnan et al. | |

FOREIGN PATENT DOCUMENTS

| | | |
|---|---|---|
| CN | 116067437 A | 5/2023 |
| EP | 1565709 B1 | 3/2014 |
| EP | 2411799 B1 | 5/2020 |
| EP | 3 835 751 A1 | 6/2021 |
| WO | 2009120770 A1 | 10/2009 |
| WO | 2016/153483 A1 | 9/2016 |
| WO | 2021/188120 A1 | 9/2021 |

OTHER PUBLICATIONS

G. J. Collie et al., "Review of Flowmeters for Carbon Dioxide Transport in CCS Applications" Greenhouse Gases: Science and Technology, 2017, vol. 7, pp. 1-19 (19 pages).

R. TJ. Porter et al., "The range and level of impurities in CO2 streams from different carbon capture sources", Intl. J. of Greenhouse Gas Control, 2015, vol. 36, 00. 161-174 (14 pages).

T. Green et al., "Two-Phase CO2 Measurement and Control in the Yates oil field", Measurement Control, 2008, vol. 41, pp. 205-207 (3 pages).

L. Wang et al.,"Mass flow measurement of gas-liquid two-phase CO2 in CCS transportation pipelines using Coriolis flowmeters" Intl. J. of Greenhouse Gas Control, 2018, vol. 68, pp. 269-275 (7 pages).

J. Weinstein, "Multiphase Flow in Coriolis Mass Flow Meters—Error Sources and Best Practices", 28th Internationla North Sea Flow Measurement Workshop, 2010 (19 pages).

D. N. Alleyne et al., "A 2-Dimensional Fourier Transform Method for the Quantitative Measurement of Lamb Modes", Ultrasonics Symposium, 1990, pp. 1143-1146 (4 pages).

D. Alleyne et al., "A two-dimensional Fourier transform method for the measurement of propagating multimode signals", The Journal of the Acoustical Society of America, 1991, vol. 89, No. 3, pp. 1159-1168 (10 pages).

International Search report issued for corresponding International Patent Application No. PCT/US2024/025795, mailed Jul. 12, 2024 (6 pages).

Written Opinion report issued for corresponding International Patent Application No. PCT/US2024/025795, mailed Jul. 12, 2024 (7 pages).

International Search Report issued for corresponding international patent application No. PCT/US2024/025847, mailed Aug. 27, 2024 (6 pages).

Written Opinion issued for corresponding international patent application No. PCT/US2024/025847, mailed Aug. 27, 2024 (8 pages).

Hansen, Laerke Skov et al., "Multi-Phase Flow Metering in Offshore Oil and Gas Transportation Pipelines: Trends and Perspectives"; Sensors; vol. 19, Issue 9, Article 2184; pp. 1-26; May 2019 (26 pages).

Farahani, Abolfazl Varvani et al., "Multi-phase flow measurement in a gas refinery using decentralized Lyapunov-based adaptive observer"; Transactions of the Institute of Measurement and Control; vol. 43, Issue 3; pp. 700-716; Feb. 2021 (17 pages).

Metwally, Ibrahim A. et al., "Comparative investigation of lightning impulse tests on electrical submersible pump motors"; Electric Power Systems Research; vol. 77, Issue 8; pp. 1065-1072; Jun. 2007 (8 pages).

Hristov, Ivan et al., "Vibrational effects on the dynamic pressure measurement standard based on a diaphragmless shock tube"; Measurement: Sensors; vol. 18, Article 100116; pp. 1-4; Dec. 2021 (4 pages).

Non-Final Office Action issued by the U.S. Patent Office for corresponding U.S. Appl. No. 18/306,057, mailed May 28, 2025 (14 pages).

International Search Report issued for corresponding international patent application No. PCT/US2025/025071, mailed Jul. 9, 2025 (5 pages).

Written Opinion issued for corresponding international patent application No. PCT/US2025/025071, mailed Jul. 9, 2025 (9 pages).

* cited by examiner

MEASUREMENT OF BULK FLOW VELOCITY AND MIXTURE SOUND SPEED USING AN ARRAY OF DYNAMIC PRESSURE SENSORS

BACKGROUND

As oil, gas, and water are produced from a well, they typically flow as a non-homogeneous mixture of phases through a pipeline from the wellhead to a separator. A multi-phase flow meter (MPFM) is a device that may be installed on a pipeline to measure the rate at which each phase (oil, gas, water) is flowing. MPFM data are essential for reservoir monitoring and production optimization. However, in many circumstances, a MPFM may not be installed due to cost or other factors, such as intrusiveness. As such, there exists a need to construct new, cheap, and non-intrusive MPFMs. Or, at least, provide systems and methods to measure and/or determine quantities useful for construction of a MPFM.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments disclosed herein generally relate to a method for determining a bulk velocity and a mixture speed of sound of a multi-phase fluid flowing in a pipe of a pipeline. The method includes the steps: obtaining a plurality of pressure signals from a plurality of pressure sensors, where each pressure sensor in the plurality of pressure sensors includes a diaphragm for sensing pressure, where the diaphragm of each pressure sensor is aligned with an inner wall of the pipe such that each pressure sensor is flush-mounted on the inner wall of the pipe; determining, using the plurality of pressure signals, a first time-of-flight of one or more flow eddies; determining, using the plurality of pressure signals, a second time-of-flight of one or more sound waves; determining, using the first time-of-flight, the bulk velocity of the multi-phase fluid; and determining, using the bulk velocity and the second time-of-flight, the mixture speed of sound of the multi-phase fluid.

Embodiments disclosed herein generally relate to a system for determining a bulk velocity and a speed of sound of a multi-phase fluid. The system includes a pipe in a pipeline, a plurality of pressure sensors disposed on the pipe, and a pressure control system that includes one or more processors and a non-transitory computer-readable memory comprising computer-executable instructions stored thereon. The instructions, when executed on the one or more processors, cause the processor to perform the following steps: obtaining a plurality of pressure signals from the plurality of pressure sensors; determining, using the plurality of pressure signals, a first time-of-flight of one or more flow eddies; determining, using the plurality of pressure signals, a second time-of-flight of one or more sound waves; determining, using the first time-of-flight, the bulk velocity of the multi-phase fluid; and determining, using the bulk velocity and the second time-of-flight, the speed of sound of the multi-phase fluid; wherein pressure sensors in the plurality of pressure sensors are separated along a longitudinal axis of the pipe according to an axial spacing; wherein the pressure sensors in the plurality of pressure sensors are angularly separated according to an angular spacing; wherein each pressure sensor in the plurality of pressure sensors comprises a diaphragm for sensing pressure; and wherein the diaphragm of each pressure sensor is aligned with an inner wall of the pipe such that each pressure sensor is flush-mounted on the inner wall of the pipe.

Embodiments disclosed herein generally relate to a non-transitory computer-readable memory that includes computer-executable instructions stored thereon that, when executed on a processor, cause the processor to perform: obtaining a plurality of pressure signals from a plurality of pressure sensors; determining, using the plurality of pressure signals, a first time-of-flight of one or more flow eddies; determining, using the plurality of pressure signals, a second time-of-flight of one or more sound waves; determining, using the first time-of-flight, a bulk velocity of a multi-phase fluid flowing in a pipe in a pipeline; and determining, using the bulk flow velocity and the second time-of-flight, a speed of sound of the multi-phase fluid.

Other aspects and advantages of the claimed subject matter will be apparent from the following description and the appended claims.

DETAILED DESCRIPTION

Figure 1:
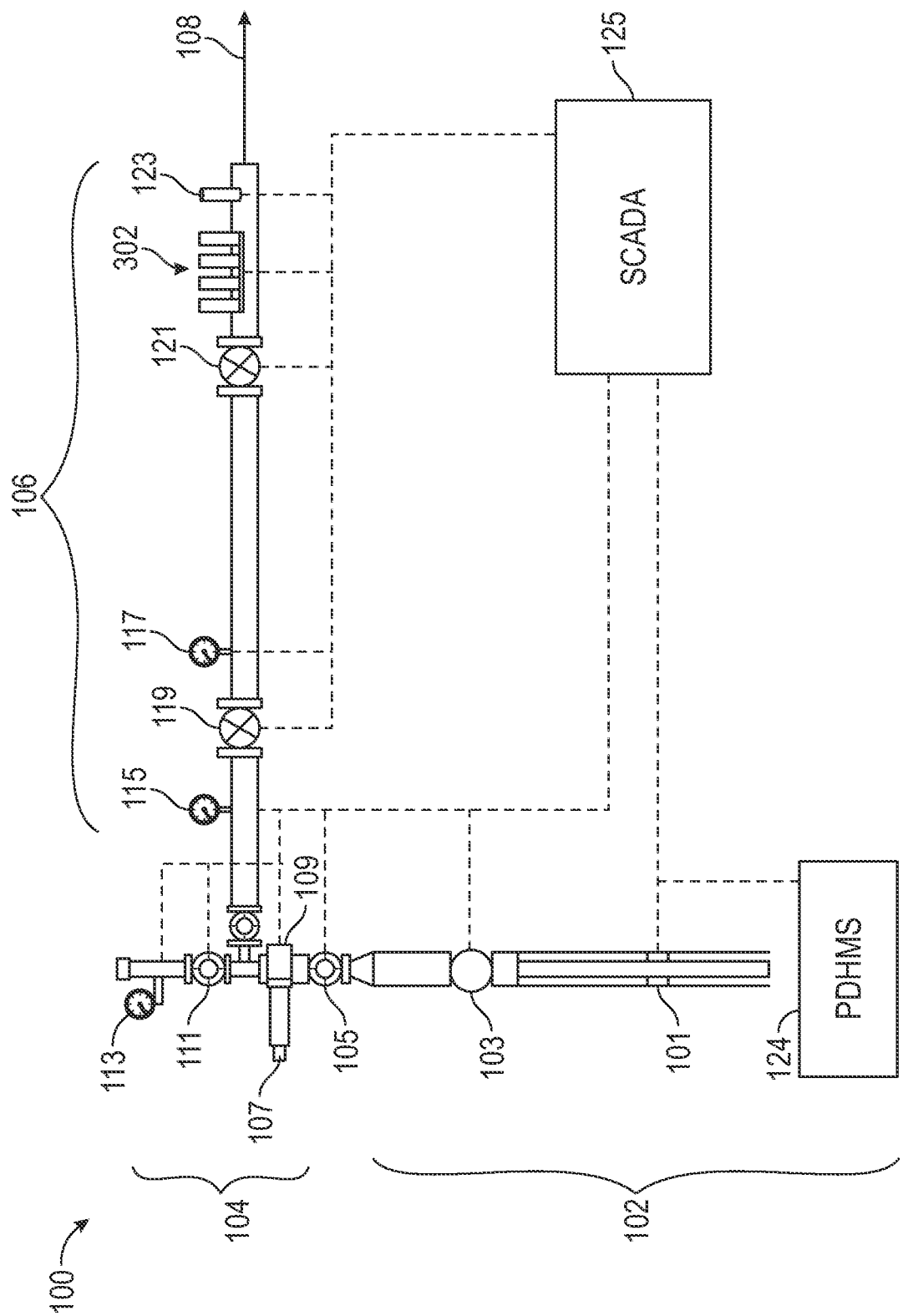
FIG. 1 depicts a pipeline, in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "acoustic signal" includes reference to one or more of such acoustic signals.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-12, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Embodiments disclosed herein relate to an apparatus to measure bulk flow velocity (and thus bulk/total flow rate), and mixture sound-speed (and thus one of the phase fractions) in a pipeline carrying a single-phase fluid (water or oil or gas) or multiphase fluids (any mixture of oil and/or water and/or gas). Applications of embodiments disclosed herein may be, for example, as part of a multiphase flowmeter (MPFM) at the well-head. In other embodiments, embodiments disclosed herein may be implemented on a test separator to measure liquid fraction in gas leg and/or gas fraction in liquid leg, and/or watercut in the liquid leg.

In accordance with one or more embodiments, FIG. 1 depicts a simplified portion of a pipeline (100) of a multi-lateral well in an oil and gas field. Herein, an oil and gas field is broadly defined to consist of wells which produce at least some oil and/or gas. Hydrocarbon wells typically produce oil, gas, and water in combination. The relative amounts of oil, gas, and water may differ between wells and vary over any one well's lifetime.

For clarity, the pipeline (100) is divided into three sections; namely, a subsurface (102) section, a tree (104) section, and a flowline (106) section. It is emphasized that pipelines (100) and other components of wells and, more generally, oil and gas fields may be configured in a variety of ways. As such, one with ordinary skill in the art will appreciate that the simplified view of FIG. 1 does not impose a limitation on the scope of the present disclosure. As part of the subsurface (102) section, FIG. 1 shows an inflow control valve (ICV) (101). An ICV (101) is an active component usually installed during well completion. The ICV (101) may partially or completely choke flow into a well. Generally, multiple ICVs (101) are installed along the reservoir section of a wellbore. Each ICV (101) is separated from the next by a packer. Each ICV (101) can be adjusted and controlled to alter flow within in the well and, as the reservoir depletes, prevent unwanted fluids from entering the wellbore. The subsurface (102) section of the pipeline (100) has a subsurface safety valve (SSSV) (103). The SSSV (103) is designed to close and completely stop flow in the event of an emergency. Generally, an SSSV (103) is designed to close on failure. That is, the SSSV (103) requires a signal to stay open and loss of the signal results in the closing of the valve. Also shown as part of the subsurface (102) section is a permanent downhole monitoring system (PDHMS) (124). The PDHMS (124) consists of a plurality of sensors, gauges, and controllers to monitor subsurface flowing and shut-in pressures and temperatures. As such, a PDHMS (124) may indicate, in real-time, the state or operating condition of subsurface equipment and the fluid flow.

Turning to the tree (104) section of FIG. 1 is a master valve (MV) (105), a surface safety valve (SSV) (107), and a wing valve (WV) (109). The MV (105) controls all flow from the wellbore. For safety considerations, a MV (105) is usually considered so important that two master valves (MVs) (second not shown) are used wherein one acts as a backup. Like unto the SSSV (103), the SSV (107) is a valve installed on the upper portions of the wellbore to provide emergency closure and stoppage of flow. Again, SSVs (107) are designed to close on failure. One or more WVs (109) may be located on the side of the tree (104) section, or on temporary surface flow equipment (not shown). WVs (109) may be used to control and isolate production fluids and/or be used for treatment or well-control purposes.

Also shown in FIG. 1 is a control valve (CV) (111) and a pressure gauge (PG) (113). The CV (111) is a valve that controls a process variable, such as pressure, flow, or temperature, by modulating its opening. The PG (113) monitors the fluid pressure at the tree (104) section.

Turning to the flowline (106) section, the flowline (106) transports (108) the fluid from the well to a storage or processing facility (not shown). A choke valve (119) is disposed along the flowline (106). The choke valve (119) is used to control flow rate and reduce pressure for processing the extracted fluid at a downstream processing facility. In particular, effective use of the choke valve (119) prevents damage to downstream equipment and promotes longer periods of production without shut-down or interruptions. The choke valve (119) is bordered by an upstream pressure transducer (115) and a downstream pressure transducer (117) which monitor the pressure of the fluid entering and exiting the choke valve (119), respectively. The flowline (106) shown in FIG. 1 has a block and bleed valve system (121) which acts to isolate or block the flow of fluid such that it does not reach other downstream components. The flowline (106) may also be outfitted with one or more temperature sensors (123).

The various valves, pressure gauges and transducers, and sensors depicted in FIG. 1 may be considered devices of an oil and gas field. As shown, these devices may be disposed both above and below the surface of the Earth. These devices are used to monitor and control components and sub-processes of an oil and gas field. It is emphasized that the oil and gas field devices depicted in FIG. 1 are non-exhaustive. Additional devices, such as electrical submersible pumps (ESPs) (not shown) may be present in an oil and gas field with their associated sensing and control capabilities. For example, an ESP may monitor the temperature and pressure of a fluid local to the ESP and may be controlled through adjustments to ESP speed or frequency.

The oil and gas field devices may be distributed, local to the sub-processes and associated components, global, connected, etc. The devices may be of various control types, such as a programmable logic controller (PLC) or a remote terminal unit (RTU). For example, a programmable logic controller (PLC) may control valve states, pipe pressures, warning alarms, and/or pressure releases throughout the oil and gas field. In particular, a programmable logic controller (PLC) may be a ruggedized computer system with functionality to withstand vibrations, extreme temperatures, wet conditions, and/or dusty conditions, for example, around a pipeline (100). With respect to an RTU, an RTU may include hardware and/or software, such as a microprocessor, that connects sensors and/or actuators using network connections to perform various processes in the automation system. As such, a distributed control system may include various autonomous controllers (such as remote terminal units) positioned at different locations throughout the oil and gas field to manage operations and monitor sub-processes. Likewise, a distributed control system may include no single centralized computer for managing control loops and other operations.

In accordance with one or more embodiments, FIG. 1 depicts a supervisory control and data acquisition (SCADA) system (125). A SCADA system (125) is a control system that includes functionality for device monitoring, data collection, and issuing of device commands. The SCADA system (125) enables local control at an oil and gas field as well as remote control from a control room or operations center. To emphasize that the SCADA system (125) may monitor and control the various devices of an oil and gas field, dashed lines connecting the plurality of oil and gas field devices to the SCADA system (125) are shown in FIG. 1.

Oil and gas field devices, like those shown in FIG. 1 (and others not shown), monitor and govern the behavior of the components and sub-processes of the oil and gas field. Therefore, the productivity of the oil and gas field is directly affected, and may be altered, by the devices. Generally, complex interactions between oil and gas field components and sub-process exist such that configuring field devices for optimal production is a difficult and laborious task. Further, the state and behavior of oil and gas fields is transient over the lifetime of the constituent wells requiring continual changes to the field devices to enhance production.

To determine the instantaneous state of the flow and to inform and optimize the settings of the field devices of a pipeline (100) to maximize hydrocarbon production, it is beneficial, if not critical, to outfit the flowline (106) with a multi-phase flow meter (MPFM). A MPFM is a device installed on the flowline (106) to measure the rate at which each phase—oil, gas, water—is flowing. That is, the MPFM may detect the instantaneous amount of gas, oil, and water. As such, the MPFM indicates additionally quantities such as percent water cut (% WC) and the gas-to-oil ratio (GOR).

Figure 2:
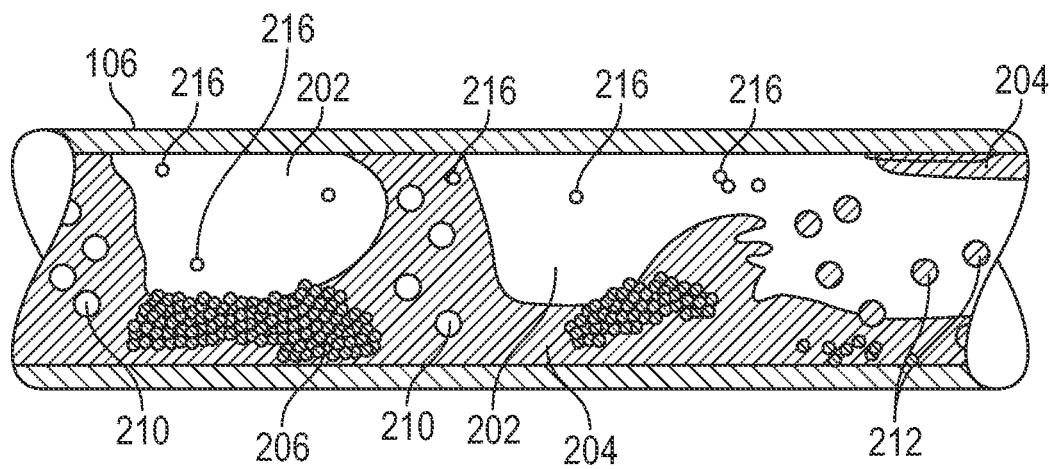
FIG. 2 depicts a section view of a fluid-carrying conduit, in accordance with one or more embodiments.

FIG. 2 depicts a simplified view of a cross-section of a flowline (106) carrying a multi-phase fluid. As seen, the multi-phase fluid may have multiple constituents such as gas (202), water (204), and oil (206). The various constituents of the multi-phase fluid may be distributed within the flowline (106) in a myriad of ways. As a non-limiting example, gas (202) may be enclosed by liquids (water or oil) forming bubbles (210). Or, in contrast, liquid droplets, such as oil droplets (206) and water droplets (212), may be dispersed in the gas (202) to form a mist. In general, the state of the multi-phase fluid may be described using broad classifications. That is, the multi-phase fluid may be categorized as "bubbly," "annular," "churn," "mist," "stratified," or other designations (flow classes) based on the distribution of the constituents and their relative quantities. The state of the multi-phase fluid may be transient such that any assignment of flow class may change with time.

As stated, multiphase flowmeter data are important for reservoir monitoring and production optimization. For example, MPFM data can be used to identify properties of the flow, determine the current flow class, and/or inform the optimal settings for other components (i.e., field devices) on the pipeline (100) (e.g., choke valve (119)). However, in many instances, MPFMs are costly and difficult to maintain. Consequently, due to cost or other constraints, a flowline (106) may not have an MPFM.

In one aspect, embodiments disclosed herein relate to a system and methods for determining the bulk flow velocity and the mixture speed of sound of a fluid flowing in a fluid-carrying conduit (e.g., a pipe). For instance, the conduit may be the flowline (106) of a pipeline (100) and/or be part of an oil and gas well. While the terms "bulk" and "mixture" generally imply that the fluid is multi-phase, embodiments disclosed herein may be applied to a single-phase fluid. Herein, the fluid will be considered a mixture of oil, gas, and water and embodiments disclosed herein will generally be discussed under the context of an oil and gas well (e.g., the flowline (106)). However, one with ordinary skill in the art will appreciate that the system and methods disclosed herein are not limited to multi-phase fluids consisting of only oil, gas, and water, nor are they limited to the context of an oil and gas well.

As will be discussed later in the instant disclosure, the quantities of bulk flow velocity and mixture speed of sound can be use with minimal additional sensor values to determine the flow rates of the constituents in a multi-phase fluid. As such, in accordance with one or more embodiments, the system and methods disclosed herein are used to construct a multi-phase flow meter (MPFM). An MPFM developed with the quantities of bulk flow velocity and mixture speed of sound, as measured by the system and methods disclosed herein, is less expensive relative to currently available MPFMs. As such, the system and methods of the instant disclosure greatly increase the accessibility of multi-phase fluid flow rate measurements. However, while measurements of the bulk flow velocity and mixture speed of sound can be used to construct a MPFM, these measurements are intrinsically useful. In one or more embodiments, the system and methods disclosed herein are used to determine the bulk flow velocity and mixture speed of sound of a multi-phase fluid.

The system includes a plurality of pressure sensors. In one or more embodiments, each pressure sensor of the plurality of pressure sensors is a pressure transducer. In one or more embodiments, each pressure transducer can record and transmit pressure data at high sampling frequencies (e.g., greater than 10 kHz). Each pressure sensor of the plurality of pressure sensors is mounted, or otherwise installed in, the fluid-carrying conduit where it is desired to measure, at least, the bulk flow velocity and the mixture speed of sound. In one or more embodiments, the pressure sensors are installed in the fluid-carrying conduit via a threaded connection (e.g., NPT). The fluid-carrying conduit may be a pipe (e.g., the flowline (106) of an oil and gas pipeline (100)). For concision, hereafter, the system and methods disclosed herein will be discussed using a pipe as an example. A pipe is a fluid-carrying conduit with a substantially circular profile. However, one skilled in the art will recognize that the system and methods disclosed herein can be applied to any fluid-carrying conduit, with any given profile, without departing from the scope of the instant disclosure. Pipes and/or flowlines may have a constant diameter or may have a varying diameter such as in the case of nozzles (including Venturi type nozzles) and diffusers without limitation. Further pipes and/or flowlines may include reducing/expanding pipe-fittings and/or adapters, etc. without departing from the scope of this disclosure.

FIG. 1 depicts a plurality of pressure sensors (302) installed on the flowline (106) section of the pipeline (100). In accordance with one or more embodiments, each pressure sensor is mounted, or installed in, the flowline (106) via a threaded connection.

Figure 3A:
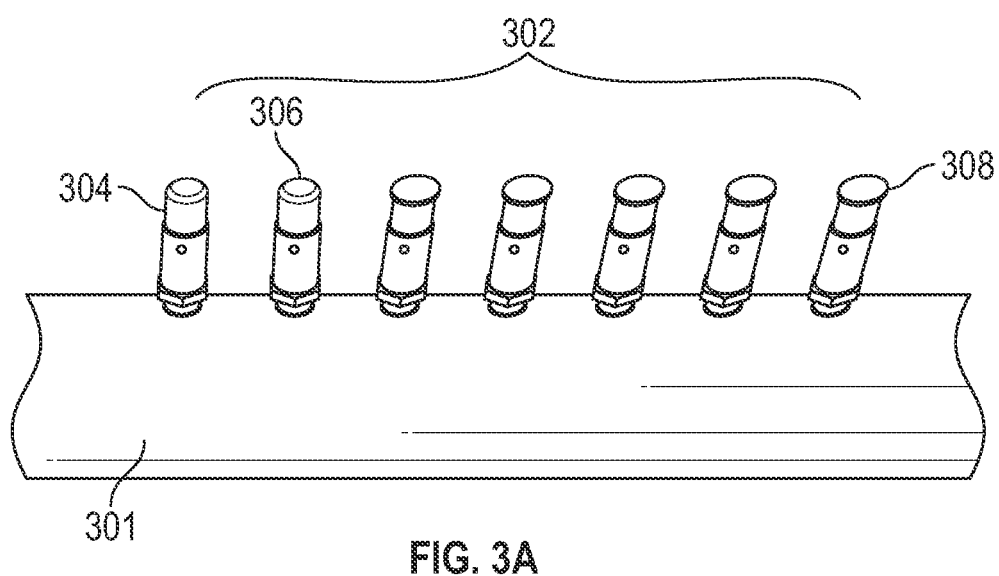
FIG. 3A depicts a plurality of pressure sensors installed in a flowline, in accordance with one or more embodiments.

FIG. 3A depicts a plurality of pressure sensors (302) mounted in a pipe (301) carrying a multi-phase fluid consisting of oil, water, and gas. In general, it may be said that the plurality of pressure sensors consists of N pressure sensors, where N is an integer greater than or equal to 2. Without loss of generality, the pressure sensors in the plurality of pressure sensors (302) may be labelled as a first pressure sensor (304), a second pressure sensor (306), and so on and so forth, until a final $N^{th}$ pressure sensor (308). Under this notation, the pressure sensors in the plurality of pressure sensors (302) are ordered and pressure sensors with consecutive labels (e.g., first and second or second and third) are considered adjacent to one another.

Figure 3B:
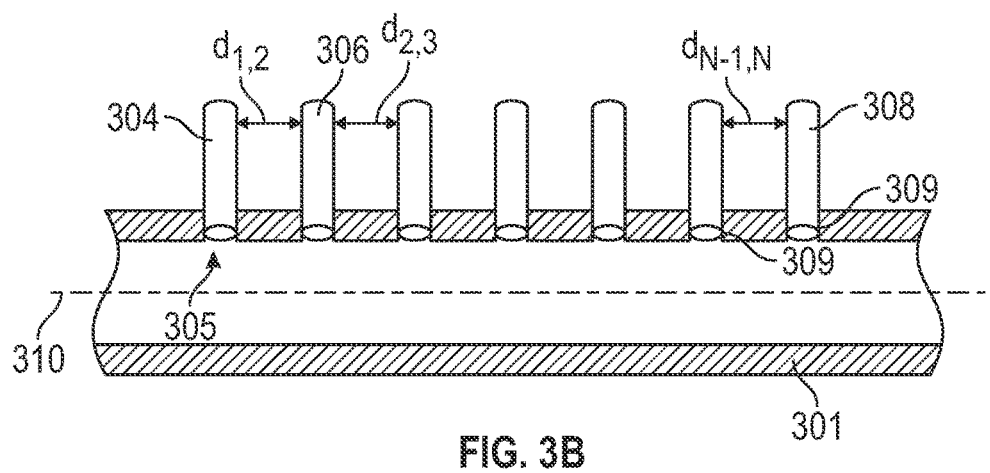
FIG. 3B depicts a section view of a flowline, in accordance with one or more embodiments.

Each pressure sensor in the plurality of pressure sensors comprises a diaphragm (309) for sensing pressure. The diaphragm (309) of each pressure sensor is aligned with an inner wall of the fluid-carrying conduit such that each pressure sensor is flush-mounted on the inner wall of the fluid-carrying conduit. FIG. 3B depicts a section view of the flowline (106) and plurality of pressure sensors (302) shown in FIG. 3A. As seen in the section view of FIG. 3B, the diaphragm (309) of each pressure sensor in the plurality of pressure sensors (302) does not extend into the internal volume enclosed by the pipe (301) nor is the diaphragm recessed into the wall of the pipe (301).

In accordance with one or more embodiments, the system further includes a pressure control system (not shown). The pressure control system is configured to receive and process the pressure signals from each pressure sensor in the plurality of pressure sensors (302). Therefore, it may be said that the pressure control system receives and processes a plurality of pressure signals, where there is a one-to-one correspondence between pressure signals and pressure sensors. In one or more embodiments, the plurality of pressure signals is received and processed directly by a SCADA (125) system, such that the SCADA (125) system may be considered the pressure control system. Use of the SCADA (125) system enables the integration of the plurality of pressure signals with all other field devices connected to the SCADA (125) system. In other embodiments, the pressure control system is a computing device. The computing device may be located proximate to the plurality of pressure sensors (302) such that the computing device is considered an "edge" computing device. In other instances, the computing device is remotely located relative to the plurality of pressure sensors (302).

A fluid-carrying conduit defines a central longitudinal axis. FIG. 3B further depicts the central longitudinal axis (310) of the pipe (301). The pressure sensors in the plurality of pressure sensors (302) are spaced according to an axial spacing and an angular spacing.

The axial spacing defines the distance between adjacent pairs of pressure sensors relative to the central longitudinal axis (310). The distance between any two adjacent pressure sensors in the plurality of pressure sensors (302) is given by $d_{n,n+1}$, where n is an index indicating the pressure sensor and $1 \leq n \leq N-1$. Therefore, in general, the axial spacing can be represented as an array of N−1 distance values (i.e., $[d_{1,2}]$ when N=2 and $[d_{1,2}, \ldots, d_{N-1,N}]$ when N>2). In accordance with one or more embodiments, the pressure sensors in the plurality of pressure sensors (302) are spaced uniformly relative to the central longitudinal axis (310). In this case, $d_{1,2}, \ldots, d_{N-1,N}=d$ such that the axial spacing may be described by a single distance value d without ambiguity.

The angular spacing defines the angle between adjacent pairs of pressure sensors relative to a plane that is perpendicular to the longitudinal central axis (310). Like the axial spacing, the angular spacing can be represented as an array of N−1 angles (i.e., $[\theta_{1,2}]$ when N=2 and $[\theta_{1,2}, \ldots, \theta_{N-1,N}]$ when N>2). In accordance with one or more embodiments, the pressure sensors in the plurality of pressure sensors (302) have uniform angular spacing. In this case. $\theta_{1,2}, \ldots, \theta_{N-1,N}=\theta$ such that the angular spacing may be described by a single angle θ without ambiguity. In the case where the plurality of pressure sensors (302) have uniform angular spacing and θ=0, the plurality of pressure sensors (302) may be said to be arranged linearly. The axial spacing of the plurality of pressure sensors (302) need not be uniform for the arrangement to be considered linear. However, no two sensors can physically be in the same spot so the axial spacing must accommodate, at least, the physical footprint of the pressure sensors.

Figure 4:
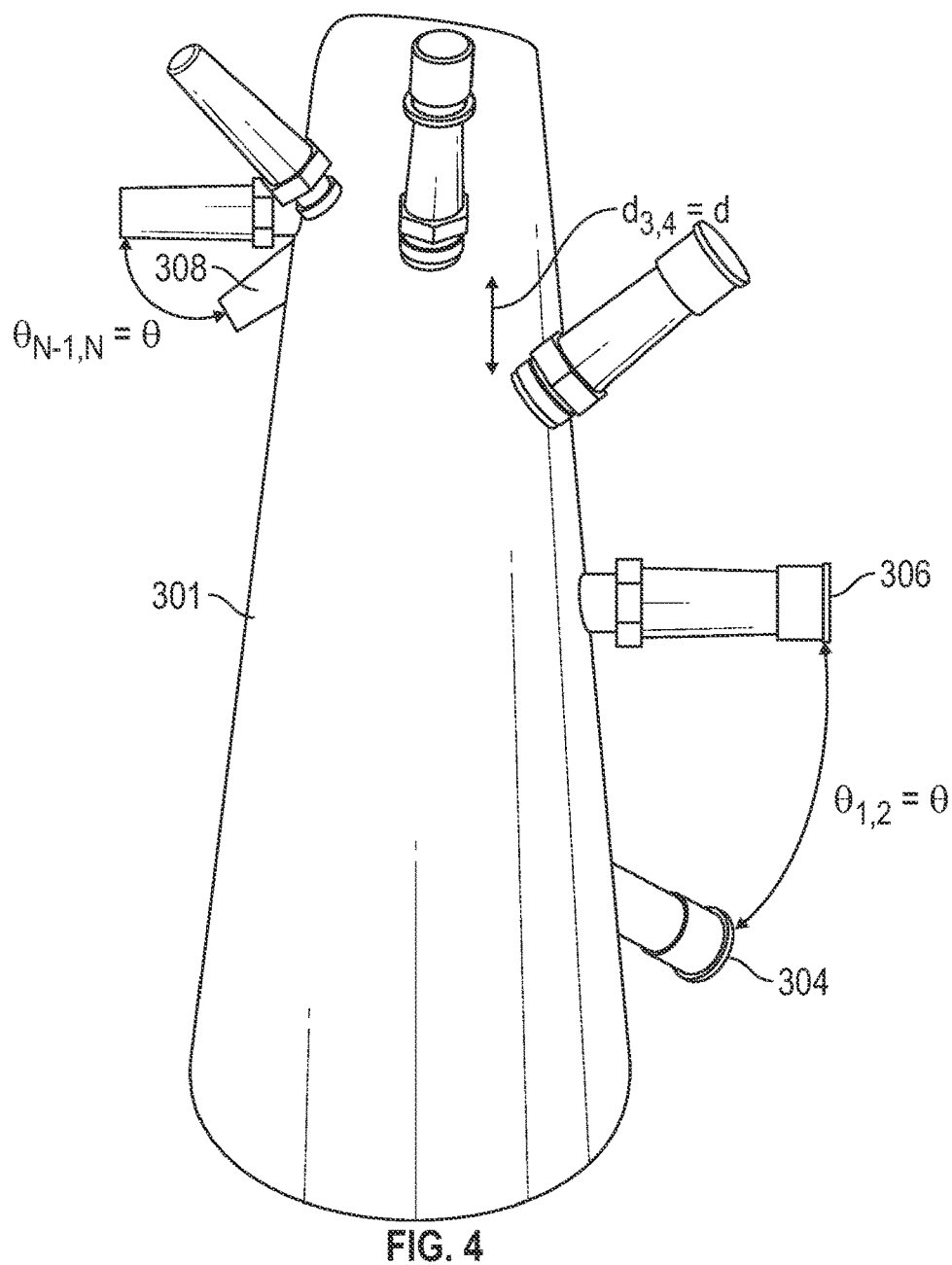
FIG. 4 depicts a plurality of pressure sensors installed in a flowline and arranged according to a helical pattern, in accordance with one or more embodiments.

In accordance with one or more embodiments, the plurality of pressure sensors (302) is installed on a fluid-carrying conduit such that the pressure sensors have uniform axial spacing and uniform angular spacing with d>0 and θ>0. In this case, the plurality of pressure sensors may be said to be arranged helically, or according to a helical arrangement. FIG. 4 depicts a pipe (301) wherein the plurality of pressure sensors (302) are arranged helically. Advantages of a helical arrangement are as follows. It is well-known that pressure disturbances propagate inside a conduit in a three-dimensional manner (i.e., not along a line). Helically disposed pressure sensors take advantage of this phenomenon by spanning the entire circumference of the pipe. Further, a helically disposed pressure sensors prevent downstream pressure sensors from getting disturbed by eddies generated by upstream pressure sensors (eddies that would be carried downstream in a relatively straight line by the flow). The mitigation of disturbances from adjacent or upstream pressure sensors achieved by the helical formation increase the signal-to-noise, especially when compared to pressure sensors arranged linearly. Finally, helically disposed pressure sensors allow for a more condenses array of pressure sensors (i.e., a smaller physical footprint along the pipe) because the sensors can be packed closer together (along the central longitudinal axis (310)) due to the angular separation. That is, the angular spacing provided by a helical arrangement allows for a reduction in the axial spacing between pressure sensors. Reduced axial spacing improves the spatial resolution of the measurements and hence may be advantageous in highly-transient flow-classes such as so-called slug flows.

Figure 5A:
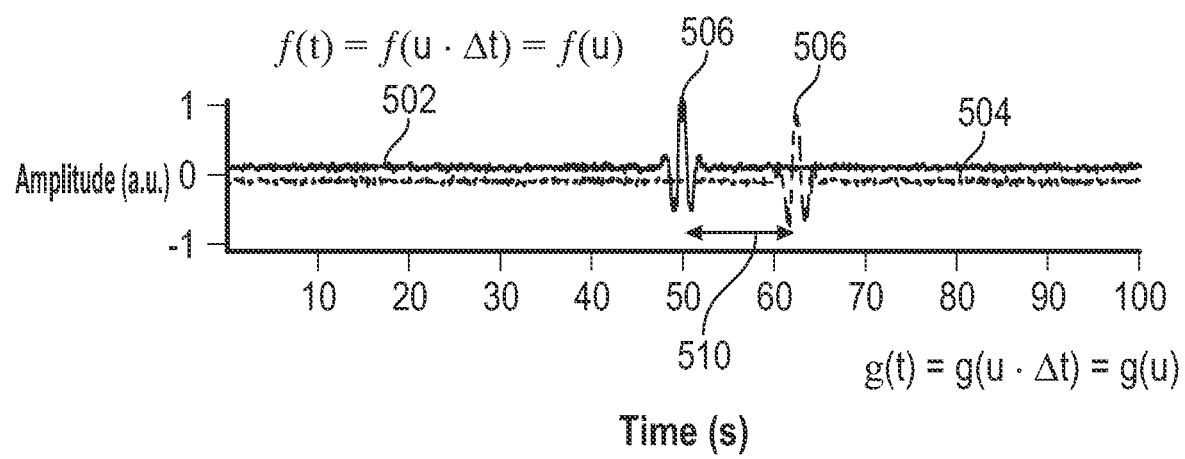
FIG. 5A depicts two time-series signals, in accordance with one or more embodiments.

As stated, in one aspect, methods disclosed herein relate to determining the bulk flow velocity and mixture speed of sound of a fluid (multi-phase or single-phase) flowing in a fluid-carrying conduit (e.g., a pipe). As will be described later in the instant disclosure, these methods use, in part, a cross-correlation scheme. To promote understanding, a basic introduction to cross-correlation applied to two signals is provided herein. One with ordinary skill in the art will recognize that many adaptions to cross-correlation schemes are known and that the provided example should not be considered limiting. Turning to FIG. 5A, FIG. 5A depicts two signals; namely, a first signal (502) and a second signal (504). Both signals are discrete time-series and represent a recorded amplitude with respect to time. The first signal (502) is represented as a time-based function, $f(t)$. Likewise, the second signal (504) is represented as a time-based function, $g(t)$. For the present example, it is assumed that the signals, being discrete, are sampled according to the same sampling frequency (e.g., the sampling frequency of the pressure transducers). Given a uniform sampling frequency, the sampled points in the signals are separated in time by a time spacing, $\Delta t$. Thus, under the time-based function notation, the signals may be represented according to an index, u, without ambiguity. That is, using the first signal (502) as an example, $f(t)=f(u \cdot \Delta t)$ and because the time spacing, $\Delta t$, is a constant, the first signal (502) may be represented simply using the index u as $f(u)$ without confusion. Further, as shown in FIG. 5A, both the first signal (502) and the second signal (504) record an event (506). An event (506) is a fluctuation in the amplitude of a signal that is notably larger than the random noise present in the signal. The event (506) shown in FIG. 5A is depicted as a sinc-like function, however, in practice, a recorded event (506) can have any form. As seen in FIG. 5A, the event (506) occurs in both the first signal (502) and the second signal (504) but at different points in time. The time separation (510) between the event is depicted by a double-sided arrow in FIG. 5A.

Figure 5B:
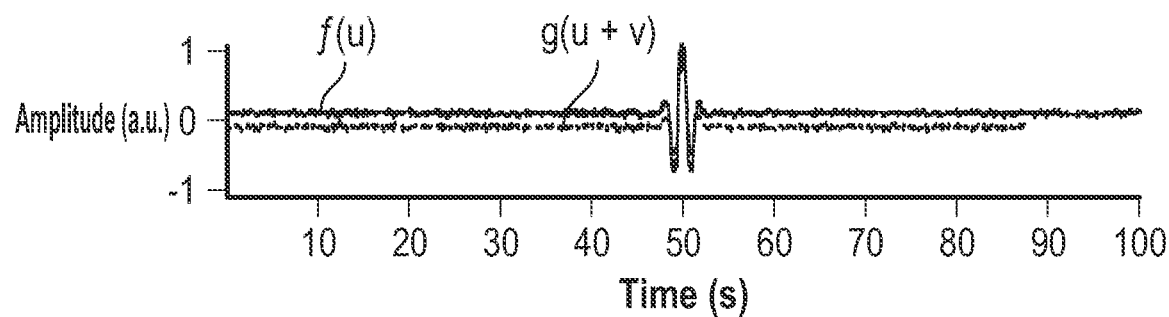
FIG. 5B depicts two time-series signals, where one signal has been shifted in time, in accordance with one or more embodiments.

An arbitrary time shift may be applied to one or more of the signals. In FIG. 5B, the second signal (502) is shifted in time by a secondary index, v. As seen in FIG. 5B, for some value v the first signal (502) and the second signal (504) become essentially aligned in time. It may be said that when appropriately shifted such that the signals are aligned, the signals are similar. Cross-correlation, in basic terms, in a measure of similarity between two signals when a time shift is applied to one of them.

In many practical applications, it is useful to determine the time separation (510) of an event (506) between two signals. In other words, it is useful to determine the shift, in time, required in one signal to align it with the other. Thus, cross-correlation can be applied to measure the similarity between two signals while one of the signals experiences many shifts. The shift that results in the greatest similarity between the two signals is indicative of the time separation (510) between events (506) recorded by the signals.

Figure 5C:
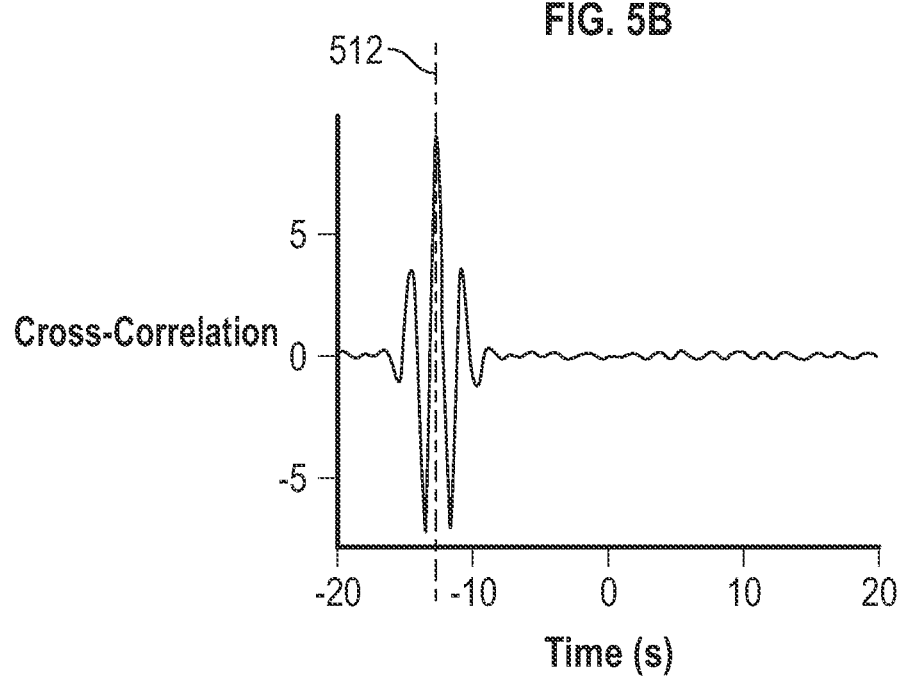
FIG. 5C depicts a cross-correlation result, in accordance with one or more embodiments.

For discrete signals, the cross-correlation of two signals is given by $$CC(u) = (f * g)(u) = \sum_{u=-\infty}^{\infty} f(v)g(u+v), \quad (1)$$

where CC is the cross-correlation value at an index (or time) of n. FIG. 5C depicts the cross-correlation values, as a function of time (or the index u) for the first signal (502) and the second signal (504) according to EQ. 1 (where the second signal (504) is shifted relative to the first signal (502)). As seen, the cross-correlation has a maximum value (512). The maximum value corresponds with a time shift of about-12 seconds. Thus, in the example shown in FIGS. 5A-5C, the time separation between signals is determined to be about 12 seconds.

Under the context of the instant disclosure, the first signal (502) and the second signal (504) may be pressure signals indicating the pressure sensed by their associated pressure sensors with respect to time. In this case, the event (506) may be a pressure event. For a flowing fluid, the pressure event may be caused by the passing of a flow eddie or a sound wave. Generally, these different types of events occur on very different temporal scales. A flow eddie nominally travels at the same speed as the bulk flow. A sound wave travels at the speed of sound for the fluid (i.e., mixture speed of sound for multi-phase fluids) plus or minus the bulk flow velocity relative to the sound wave. That is, if the sound wave is travelling in the direction of the fluid flow, then its observed velocity is $$V_{sw} = SoS + V_{bulk} \quad (2)$$

and if the sound wave is travelling in the direction opposite of the fluid then its observed velocity is $$V_{sw} = SoS - V_{bulk}. \quad (3)$$

In EQs. 2 and 3, $V_{bulk}$ is the bulk velocity of the fluid, SOS is the speed of sound (the velocity at which a sound wave travels in the fluid when the fluid is at rest), $V_{sw}$ is the velocity of the sound wave observed from the fixed frame of reference established by the pressure sensors (i.e., Eulerian viewpoint). A sound wave may originate from any number of flow-induced sources and, in general, may travel with or against the flow of the fluid. Using a cross-correlation scheme, the time between pressure events, whether the pressure event is related to a flow eddie or a sound wave, may be determined. In practice, classifying a pressure event as either a flow eddie or a sound wave is relatively simple due to the fact that these operate on two different time scales and because sound waves may propagate bidirectionally relative to the movement of the fluid.

Using the simplified case of only two pressure sensors as an example, a cross-correlation scheme, such as that shown in EQ. 1, can be applied to the associated signals to determine the time separation of one or more pressure events. Assuming that the spatial separation between sensors is also known, the time separation and the spatial separation can be used to calculate the velocity of a pressure event. As an example, consider an event that has been detected by two pressure sensors, where the pressure sensors are separated by a known axial spacing of $x_s$. Using a cross-correlation scheme, the time separation of the event is determined to be $t_s$. For the present example, it stated that $t_s$ is found to be relatively long such that the pressure event is determined to be caused by a flow eddie. The time separation of this pressure event is presented as $t_{fe}$ to emphasize that the time separation corresponds with a flow eddie pressure event. In this simple case, the velocity of the flow eddie pressure event is calculated as $v_{flow\ eddie}=x_s/t_{fe}$. Because flow eddies are known to travel at similar speed to the bulk flow, the bulk velocity of the fluid is also the velocity of the flow eddie pressure event (i.e., $v_{bulk}=v_{flow\ eddie}$). Thus, the bulk velocity of a fluid may be determined. Similarly, if a pressure event is identified as a sound wave and its time separation is determined using cross-correlation as $t_{sw}$ (where the subscript sw emphasizes that the pressure event is caused by a sound wave), then the observed velocity of the sound wave is $v_{sw}=x_s/t_{sw}$. With knowledge of the fluid bulk velocity and the velocity of a sound wave propagating in the fluid, the mixture speed of sound may be determined using either EQ. 2 or EQ. 3.

It is noted that the above example using the cross-correlation scheme of EQ. 1 and two pressure sensors with known spacing is purposefully simple to promote understanding. In practice, more than two pressure sensors may be used. Further, many alterations, adaptations, and improvements to the cross-correlation scheme of EQ. 1 may be used. One with ordinary skill in the art will recognize that the cross-correlation scheme may be readily adapted and applied to more than two signals simultaneously. In one or more embodiments, the cross-correlation scheme may be time-varying such that substantially instantaneous measurements of the time separation of events may be determined. Further, the cross-correlation scheme may distinguish between, or be used, when multiple overlapping events are present in the recorded signals. In general, due to noise and other signal fluctuations, recorded signals may not be in alignment even with a correct time shift applied. In one or more embodiments, the cross-correlation scheme may aggregate results. In one or more embodiments, the cross-correlation scheme may employ a Fourier transform, such as a two-dimensional Fourier transform, so that the cross-correlation scheme uses the frequency content of the recorded signals.

Figure 6:
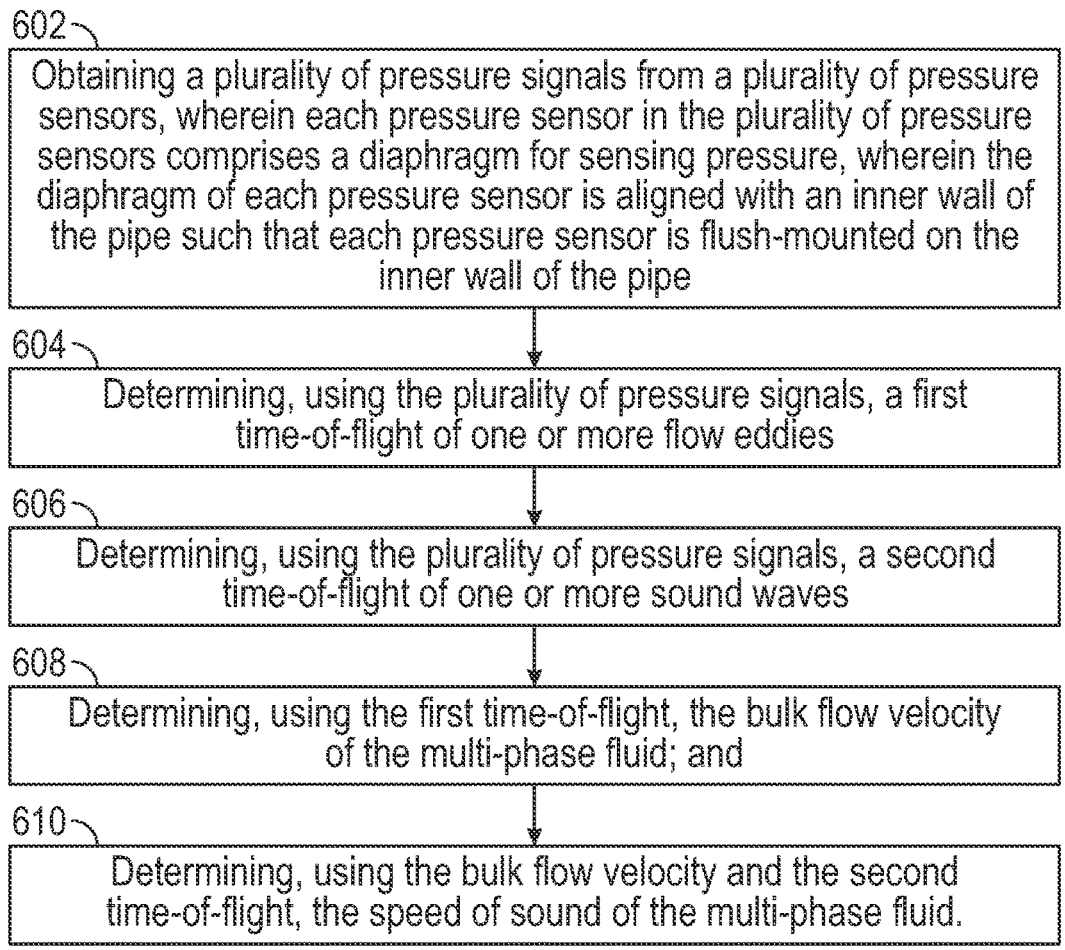
FIG. 6 depicts a flowchart, in accordance with one or more embodiments.

In accordance with one or more embodiments FIG. 6 depicts a flowchart outlining the steps to determine the bulk flow velocity and mixture speed of sound of a fluid flowing in a fluid-carrying conduit using a plurality of pressure sensors (302). Further, it is assumed that the axial spacing and angular spacing of the pressure sensors in the plurality of pressure sensors are known. That is, at the very least, the relative locations of the pressure sensors on the fluid-carrying conduit are known. Each pressure sensor outputs a pressure signal which may be considered a series of pressure values in time. Because there is a pressure signal for each pressure sensor in the plurality of pressure sensors (302) it may be said that there is a plurality of pressure signals without undue ambiguity. In Block 602, the plurality of pressure signals is received by the pressure control system which may be the SCADA (125) system or other computing device. Each pressure sensor in the plurality of pressure sensors has a diaphragm for sensing pressure. The diaphragms are aligned with an inner wall of the fluid-carrying conduit such that each pressure sensor is flush-mounted on the inner wall of the pipe. Using the pressure control system, in Block 604, a first time-of-flight of one or more flow eddies moving with the fluid in the fluid-carrying conduit is determined. In one or more embodiments, the first time-of-flight is determined using a two-dimensional cross-correlation scheme.

In Block 606, using the plurality of pressure signals, a second time-of-flight is determined. The second time-of-flight corresponds to the time-of-flight of one or more sound waves propagating in the fluid-carrying conduit. Again, in accordance with one or more embodiments, the two-dimensional cross-correlation scheme is used.

In Block 608, using the first time-of-flight, the bulk flow velocity of the fluid is determined using a knowledge of the first time-of-flight and, at least, the axial spacing of the plurality of pressure sensors (302).

In Block 610, using the bulk flow velocity determined in Block 608 and the second time-of-flight determined in Block 606, the speed of sound of the fluid is determined. The speed of sound of the fluid is determined using either, or both, of EQs. 2 and 3 depending on the relative velocities of the fluid and the one or more sound waves, where the velocity of the one or more sound waves is determined using the second time-of-flight and knowledge of, at least, the axial spacing of the plurality of pressure sensors (302). In accordance with one or more embodiments, the determination of the first and second time-of-flights, the bulk flow velocity, and the mixture speed of sound are performed using the pressure control system.

As outlined in the flowchart of FIG. 6, the bulk velocity of the fluid (which may be single- or multi-phase) and the speed of sound (or mixture speed of sound for a multi-phase fluid) of the fluid can be determined using the plurality of pressure sensors, pressure control system, and methods disclosed herein. These measurements, along with additional sensor values and physical relationships, may be used to construct an alternative MPFM. That is, in one or more embodiments, the plurality of pressure sensors and accompanying methods to determine the bulk flow velocity and mixture speed of sound using the plurality of pressure sensors, can be used as part of an MPFM or to form a new MPFM. Physical relationships may include, but are not limited to: analytical or tabulated equations of state (EoS); conservation equations; and phenomenological models.

Typically, to construct a MPFM for use with a multi-phase fluid consisting of oil, gas, and water, the MPFM must be capable of making, at least, the following four independent measurements: total flow rate; gas volume fraction; water volume fraction; and slip ratio. The total flow rate is simply the sum of the flow rates of the individual constituents in a multi-phase fluid. Mathematically, the total flow rate is described as $$Q_{total} = Q_{oil} + Q_{gas} + Q_{water}, \quad (4)$$

where Q indicates a volumetric flow rate (e.g., m$^3$/s).

Gas volume fraction is the volumetric fraction of gas compared to total volume of the multi-phase fluid, or $$\alpha_{gas} = \frac{Q_{gas}}{Q_{total}}. \quad (5)$$

Similarly, water volume is the volumetric fraction of water compared to the total volume of the multi-phase fluid, or $$\alpha_{water} = \frac{Q_{water}}{Q_{total}}. \quad (6)$$

Alternatively, in some instances, the water-liquid ratio (WLR) is computed instead of the water volume fraction. The water-liquid ratio is, as the name implies the volumetric fraction of water compared to all liquid constituents in the multi-phase fluid. The water-liquid ratio is given as $$WLR = \frac{Q_{water}}{Q_{oil} + Q_{water}}. \quad (7)$$

Finally, the slip ratio is the ratio of velocity of the gas relative to the velocity of the liquid components in the multi-phase fluid. The slip ratio is given as $$S = \frac{V_{gas}}{V_{liquid}}. \quad (8)$$

If one or more devices measure the total flow rate, gas volume fraction, water volume fraction or water-liquid ratio, and the slip ratio, then the individual flow rates of the constituents-oil, water, gas—can be determined (i.e., $Q_{oil}$, $Q_{water}$, $Q_{gas}$). Thus, a device, or more than one device that when used together, that can determine the individual flow rates of the constituents in a multi-phase fluid can be said to be a MPFM.

Figure 7A:
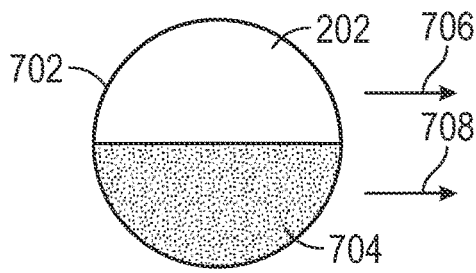
FIG. 7A depicts a cross-section of a fluid-carrying pipe, in accordance with one or more embodiments.
Figure 7B:
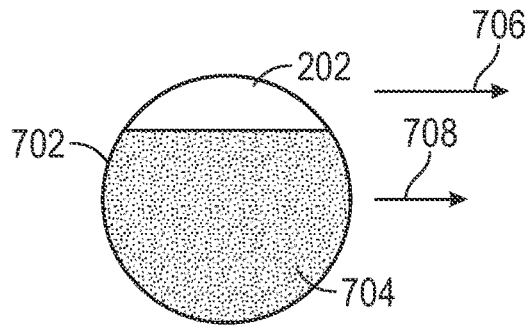
FIG. 7B depicts a cross-section of a fluid-carrying pipe, in accordance with one or more embodiments.

As will be shown herein, the bulk flow velocity and the mixture speed of sound, as determined with the system and methods previously described, can be used with a water-liquid ratio sensor, a temperature sensor, and physical relationships to determine the individual flow rates of oil, water, and gas in a multi-phase fluid. A first physical relationship of note deals with the relationship between gas volume fraction, water-liquid ratio, and the slip ratio. To illustrate this physical relationship, a two-dimensional cross-section of an example pipe (702) carrying a multi-phase fluid of oil, water, and gas, where the cross-section is orthogonal to the longitudinal axis of the conduit, is shown in FIGS. 7A and 7B. The example pipe (702) has a known internal cross-sectional area, given as $A_{pipe}$. In FIGS. 7A and 7B, the cross-section of the example pipe (702) contains an area filled by gas (202), $A_{gas}$, and an area filled by oil and water, or liquid (704), $A_{liquid}$. The ratio of the area of the example pipe (702) filled with gas to the area of the pipe is known as the gas void fraction, $A_{gas}$. The gas void fraction is mathematically described as $$\lambda_{gas} = \frac{A_{gas}}{A_{pipe}}. \quad (9)$$

Likewise, the area of the example pipe (702) filled with liquid (704) to the area of the pipe is known as the liquid void fraction, $A_{liquid}$, and is given by $$\lambda_{liquid} = \frac{A_{liquid}}{A_{pipe}}. \quad (10)$$

The liquid void fraction is commonly referred to as the liquid holdup in the literature. As such, hereafter, the liquid void fraction will be referred to as the liquid holdup. By definition, the gas void fraction and the liquid holdup must add to one, or $$\lambda_{gas} + \lambda_{liquid} = 1. \quad (11)$$

FIGS. 7A and 7B further depict a gas velocity arrow (706) and a liquid velocity arrow (708). The gas velocity arrow (706) and liquid velocity arrow (708) are for illustration purposes only and the lengths of the arrows are intended to indicate the magnitude of gas (202) velocity and the liquid (704) velocity, respectively. For example, in FIG. 7A, the gas velocity arrow (706) and the liquid velocity arrow (708) have the same length indicating that in the example of FIG. 7A the gas (202) velocity is equal to the liquid velocity (704) (i.e., $V_{gas}=V_{liquid}$).

When gas (202) and liquid (704) flow in a fluid-carrying conduit, such as the example pipe (702), the relative proportions of the gas void fraction and liquid holdup are related to the slip ratio. FIG. 7A depicts the case where there is no slip between the gas and liquid phases flowing in the example pipe (702)

$$\left(\text{i.e., } S = \frac{V_{gas}}{V_{liquid}} = 1\right),$$

also known as no-slip conditions. FIG. 7B depicts the case when there is slip between the gas and liquid phases flowing in the example pipe (702), also known as slip conditions. Generally, when there is slip between the gas and liquid phases, the velocity of the gas phase is greater than the velocity of the liquid phase $$\left(\text{i.e., } S = \frac{V_{gas}}{V_{liquid}} > 1\right).$$

Under no-slip conditions, the gas void fraction equals the gas volume fraction the liquid holdup equals the volume faction $$\left(\alpha_{liquid} = \frac{Q_{water} + Q_{oil}}{Q_{total}}\right),$$

and the slip ratio is equal to 1.0. That is, under no-slip conditions $V_{gas}=V_{liquid}$, $\alpha_{gas}=\lambda_{gas}$, and $\alpha_{liquid}=\lambda_{liquid}$.

The case of slip conditions in shown in FIG. 7B. Under slip conditions, where the gas phase has a higher velocity than the liquid phase (i.e., $V_{gas} \geq V_{liquid}$), the following relationships hold:

$$\lambda_{liquid} \geq \alpha_{liquid}, \quad (12)$$

$$\lambda_{gas} \leq \alpha_{gas}, \quad (13)$$

$$V_{s,gas} = \frac{Q_{gas}}{A_{pipe}} = \frac{Q_{gas}}{A_{gas}} \frac{A_{gas}}{A_{pipe}} = V_{gas}\lambda_{gas}, \text{ and} \quad (14)$$

$$V_{s,liquid} = \frac{Q_{liquid}}{A_{pipe}} = \frac{Q_{liquid}}{A_{liquid}} \frac{A_{liquid}}{A_{pipe}} = V_{liquid}\lambda_{liquid}, \quad (15)$$

where $V_{s,gas}$ and $V_{s,liquid}$ are the superficial gas velocity and the superficial liquid velocity, respectively.

Figure 8:
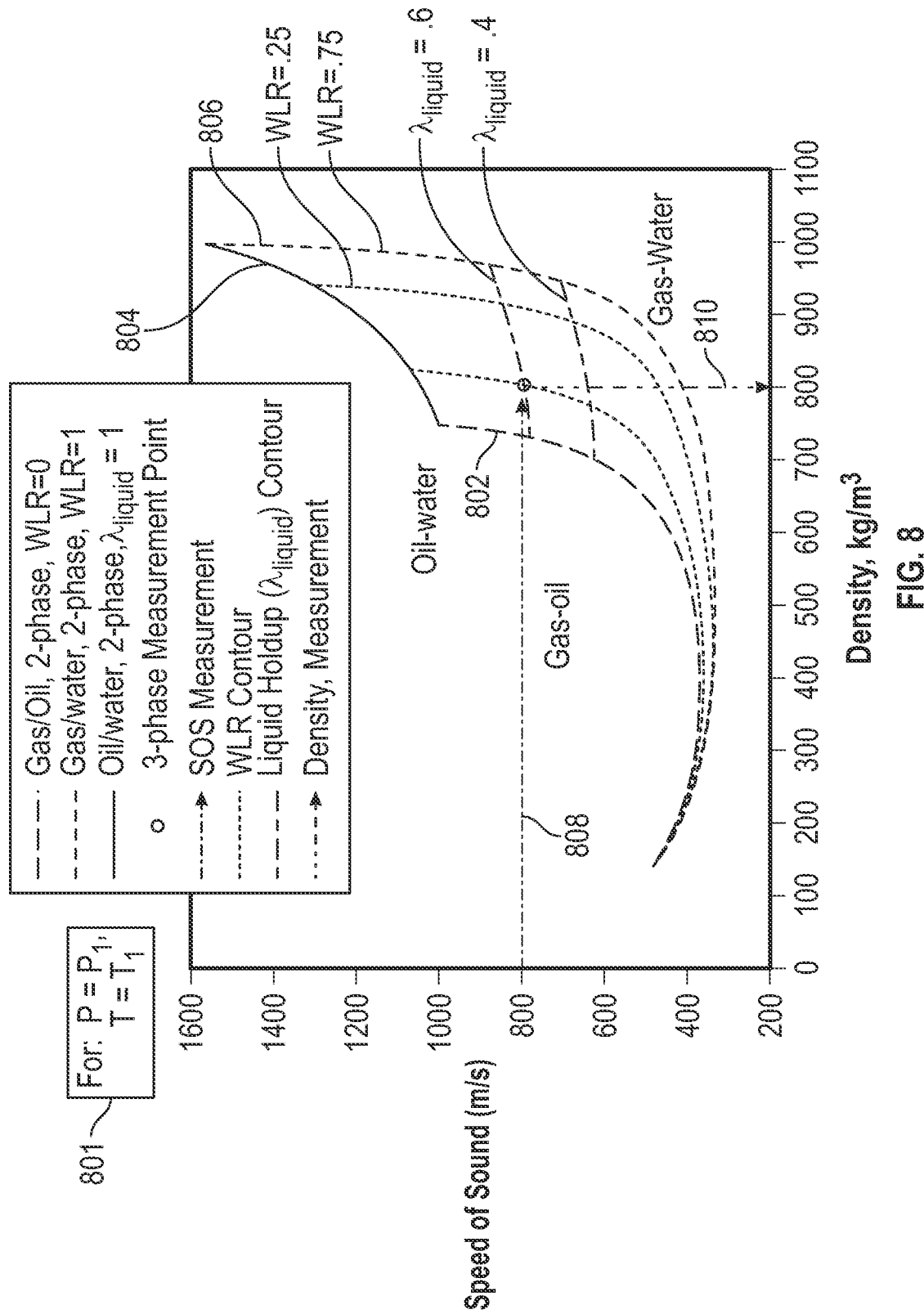
FIG. 8 depicts a physical relationship, in accordance with one or more embodiments.

A second physical relationship of note is that for a multi-phase fluid composed of oil, water, and gas, for a given temperature and pressure, there is a unique relationship between the mixture speed of sound, the mixture density, and the water-liquid ratio and the liquid holdup. This relationship is commonly referred to as Wood's relationship or Wood's equations in the literature. FIG. 8 depicts this relationship for a given temperature and pressure (801), where pressure P is equal to a pressure $P_1$ and temperature T is equal to a temperature $T_1$. In general, there exists a unique relationship, which can be graphically represented as shown in FIG. 8, for commonly occurring pressure and temperature combinations.

FIG. 8 depicts a solution domain, or solution envelope, generally relating the mixture speed sound to the bulk density of the mixture (multi-phase fluid of oil, water, and gas). The solution envelope is enclosed by three two-phase curves. The two-phase curves are the gas-oil curve (802), the oil-water curve (804), and the gas-water curve (806). For the example shown in FIG. 8, in the case of the oil-water curve (804), the mixture speed of sound the bulk density can be directly and uniquely related. However, for the gas-oil curve (802) and the gas-water curve (806) additional information regarding the relative proportion of gas and oil or gas and water is needed to uniquely relate the mixture speed of sound to the bulk density. In general, the solution envelope contains contours representing values for the water-liquid ratio and the liquid holdup. A select few of these contours are shown in FIG. 8. To avoid cluttering the figure, not all contours are shown. Any three-phase (oil, water, gas) point within the solution envelope will intersect with a unique water-liquid ratio contour and a unique liquid holdup contour. As such, mixture speed of sound, bulk density, liquid holdup and water-liquid ratio are all related and knowing any two of these quantities will provide the values for the remaining two quantities.

In one or more embodiments, a water-liquid ratio sensor, a static pressure sensor, and a temperature sensor are disposed proximate to the plurality of pressure sensors (302). Using the static pressure sensor, the pressure of the multi-phase fluid may be determined. Likewise, the temperature sensor may be used to determine the temperature of the multi-phase fluid. Thus, with the pressure and temperature, the correct Wood's relationship (e.g., FIG. 8) can be selected. Using the plurality of pressure sensors (302) the mixture speed of sound may be determined according to the previously described methods of the instant disclosure. The water-liquid ratio sensor measures the water-liquid ratio. Using the mixture speed of sound and the measured water-liquid ratio, the bulk density and the liquid hold up can be determined using Wood's relationship. Thus, by adding a temperature sensor, a static pressure sensor, and a water-liquid ratio sensor the liquid holdup and bulk density of the multi-phase fluid can be determined in addition to the mixture speed of sound and the bulk velocity. The bulk density, $\rho_{bulk}$, can also be related to the densities of the individual constituents, oil, water, and gas, as follows:

$$\rho_{bulk} = \rho_{gas} \cdot \alpha_{gas} + \rho_{water} \cdot \alpha_{water} + \rho_{oil} \cdot (1 - \alpha_{gas} - \alpha_{water}), \quad (16)$$

where $\rho_{gas}$, $\rho_{water}$, $\rho_{oil}$ represent the density of the gas, water, and oil in the multi-phase fluid, respectively. In one or more embodiments, using EQ. 16, the bulk density and gas fraction can be calculated assuming the water liquid ratio (WLR) and pure-phase densities (i.e., $\rho_{gas}$, $\rho_{water}$, $\rho_{oil}$) are known. It is noted that the densities, $\rho_{gas}$, $\rho_{water}$, and $\rho_{oil}$ are dependent on temperature and pressure. Given a temperature and pressure, any individual density can be determined using, for example, a tabulated equation of state (EoS).

Figure 9A:
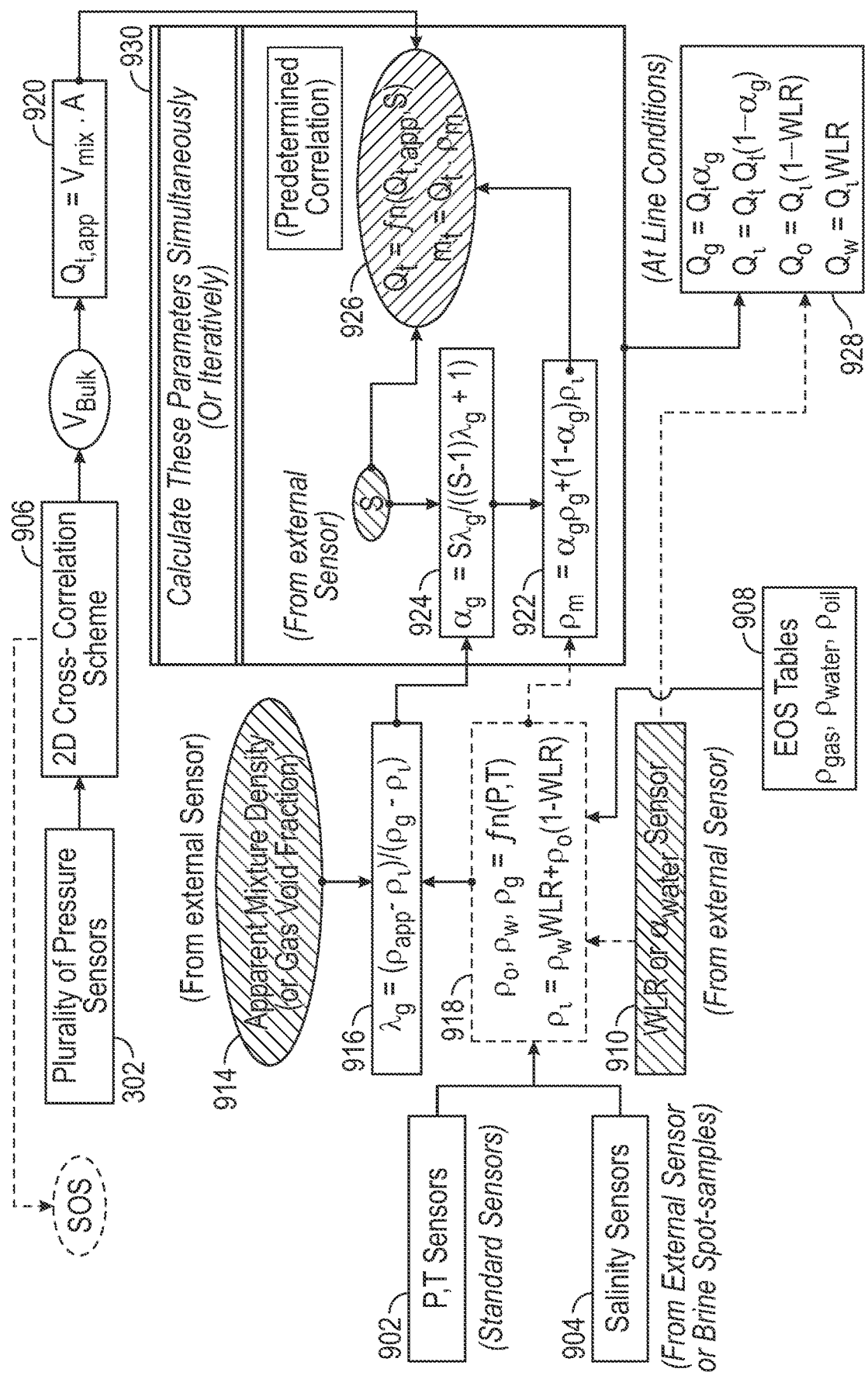
FIG. 9A depicts a workflow, in accordance with one or more embodiments.
Figure 9B:
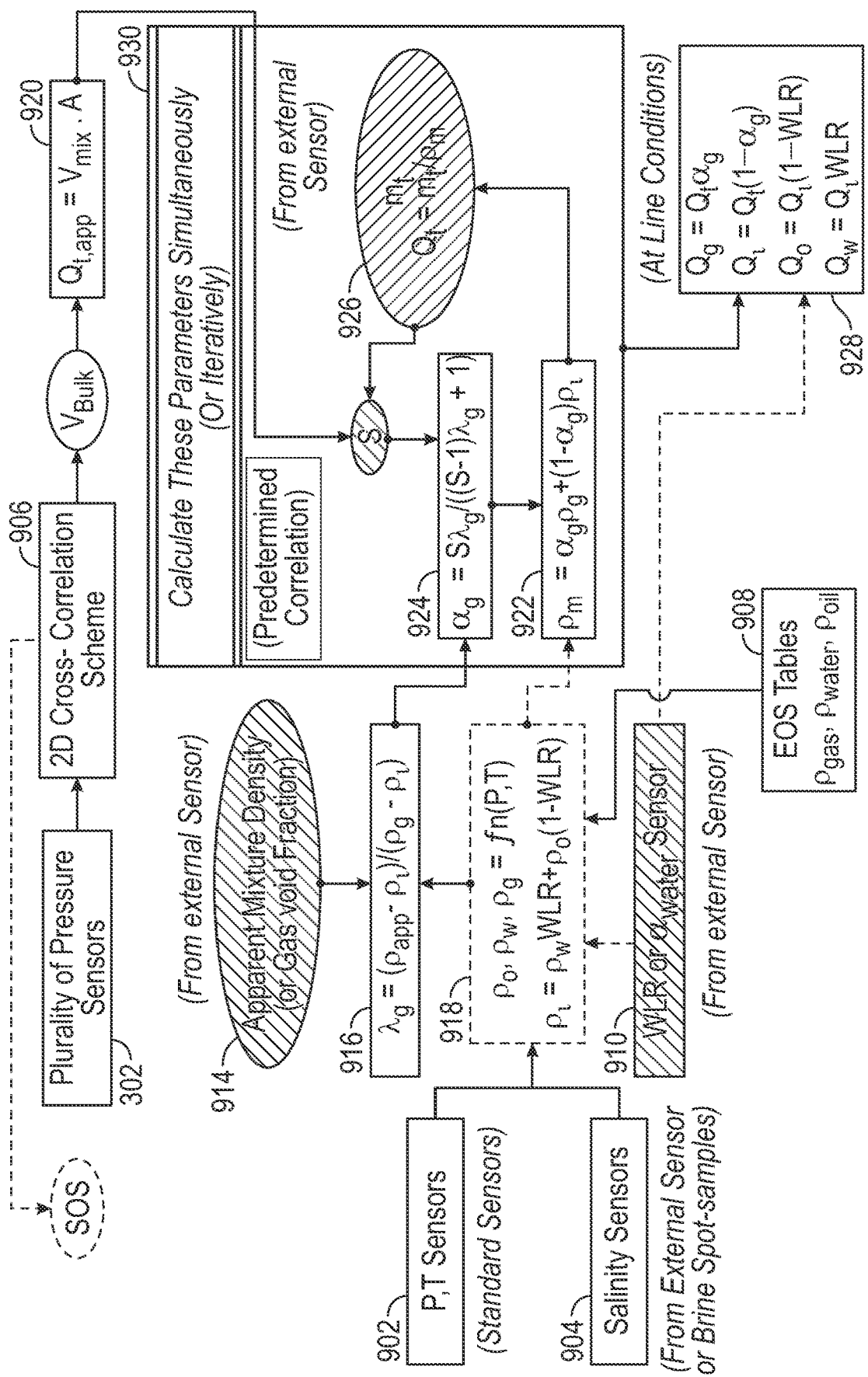
FIG. 9B depicts a workflow, in accordance with one or more embodiments.
Figure 9C:
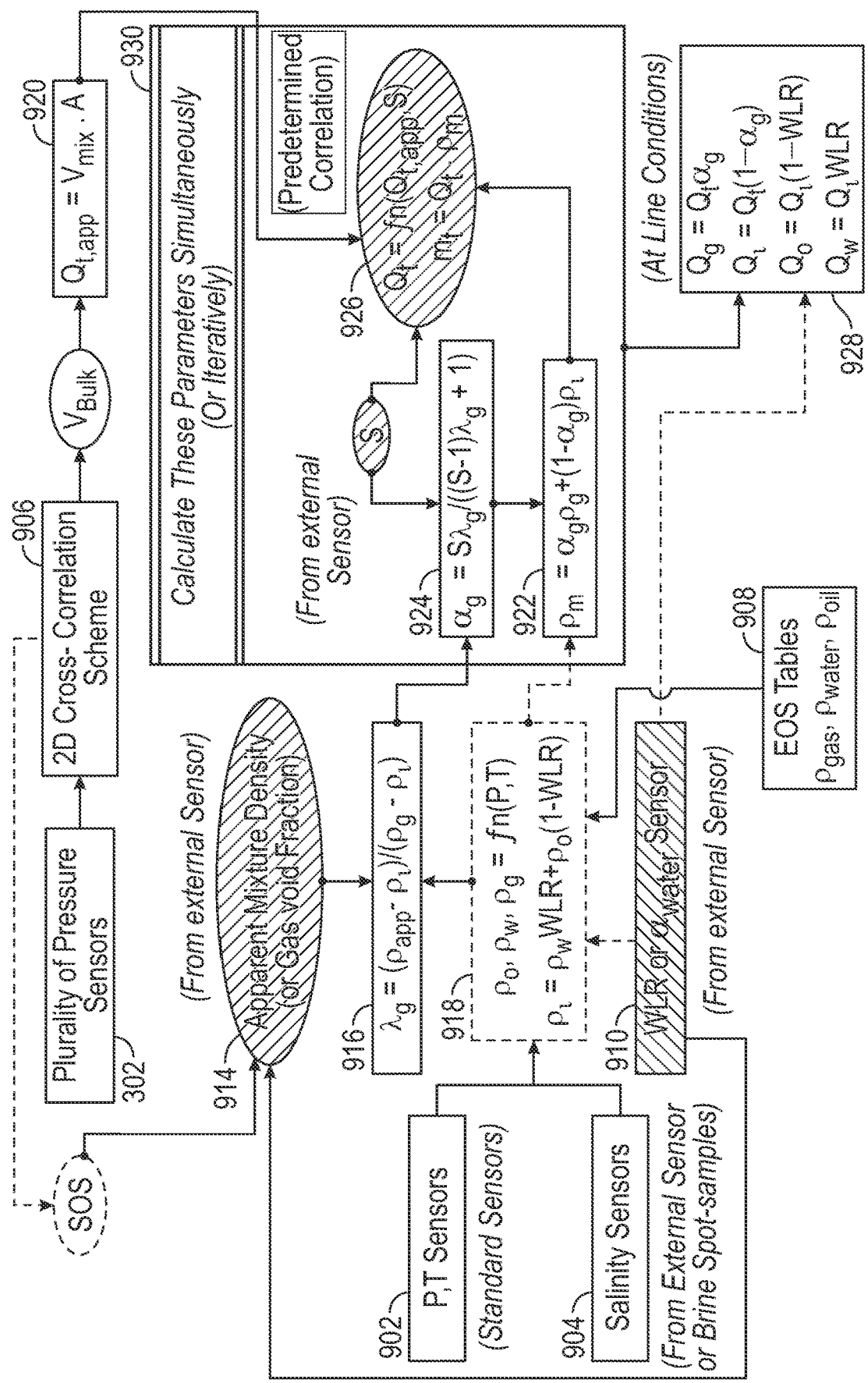
FIG. 9C depicts a workflow, in accordance with one or more embodiments.

As described, by adding a temperature sensor, a static pressure sensor, and a water-liquid ratio sensor to the plurality of pressure sensors (302) the bulk velocity, mixture speed of sound, bulk density, liquid-water ratio, and liquid holdup of a multi-phase fluid of oil, water, and gas can be determined. These measurements, some of which may be considered derived measurements, can be used with equations 4 through 16 to determine the individual flow rates of the oil, water, and gas (i.e., $Q_{oil}$, $Q_{water}$, $Q_{gas}$) to construct a MPFM. Various workflows to construct an MPFM using the plurality of pressure sensors (302) and the bulk velocity and speed of sound velocity measurements as previously described are depicted in FIGS. 9A-9C, in accordance with one or more embodiments. FIGS. 9A-9C differ in which quantities are measured by supplied external sensors and which are estimated by correlations. That is, in order to provide proper closure to the relationships of EQs. 4-16, one or more additional quantities must be directly measured by an external sensor and/or estimated. However, there are multiple combinations of external sensors and/or estimates that may be used to provide closure. As such, FIGS. 9A-9C depict multiple ways to integrate the plurality of pressure sensors (302) and associated bulk velocity and speed of sound calculations (See FIG. 6) with other external sensors to construct a low-cost MPFM capable of determining the individual phase volume flow rates of a multi-phase fluid.

For FIGS. 9A-9C, the following nomenclature is used.

SYMBOLS

A=pipe flow cross-sectional area
P=process static pressure
Q=volume flow rate
S=split ratio (gas to liquid)
SoS=speed of sound
T=process temperature
V=flow velocity
WLR=water liquid ratio
m=mass flow rate
q=flow dynamic pressure
α=volume fraction
λ=void fraction or liquid hold up
ρ=density
Subscripts:
   app=apparent
   g=gas
   l=liquid
   m=mixture
   o=oil
   t=total
   w=water In the following discussion of FIGS. 9A-9C, it is assumed that a plurality of pressure sensors (302) is flush-mounted to a pipe carrying a multi-phase fluid composed of water, oil, and gas. Further, it is assumed that at least the axial spacing of the plurality of pressure sensors (302) is known. Additionally, at least one temperature sensor, at least one static pressure sensor, and at least one water-liquid ratio (WLR) sensor are assumed to be installed proximate the plurality of pressure sensors (302). FIG. 9A depicts a method to determine multi-phase flow rates using measurements from external sensors to measure or estimate the apparent mixture density, slip ratio, and WLR. As shown in FIG. 9A, a plurality of pressure signals is obtained from the plurality of pressure sensors (302). The plurality of pressure signals is passed to a two-dimensional cross-correlation scheme (906) to determine a first time-of-flight and a second time-of-flight. The first time-of-flight corresponds to the time required (or average time) for one or more flow eddies to pass by the plurality of pressure sensors (302). Likewise, the second time-of-flight corresponds to the time required (or the average time) for one or more sound waves to pass by the plurality of pressure sensors (302). Using the first time-of-flight, the second time-of-flight, and the axial spacing, the bulk velocity and mixture speed of sound of the multi-phase fluid are determined. The bulk velocity is used to determine an apparent total volume flow rate (920).

Continuing with FIG. 9A, one or more temperature and dedicated static pressure sensors (902) measure the temperature and pressure of the multi-phase fluid. In other embodiments, one or more of the pressure sensors from the plurality of pressure sensors (302) is used to measure the static pressure of the multi-phase fluid. Additionally, in one or more embodiments, one or more salinity sensors (904) are used to measure the salinity of the water phase in the multi-phase fluid. The pressure, temperature, and salinity values are used with equation of state (EoS) tables (908) to determine the individual densities of the oil, water, and gas in the multi-phase fluid (918). As stated, the pipe is also outfitted with a water-liquid ratio (WLR) sensor (910). The WLR sensor (910) may be of type: gamma-ray attenuation, Coriolis, near-infrared absorption, or other type. In some embodiments, a sensor capable of measuring the water volume fraction, $\alpha_{water}$, is used in lieu of a WLR sensor. In either case, a measurement for the WLR is made. The pressure and temperature sensors (902) are used to select the correct Wood's relationship (912) (e.g., FIG. 8). Using Wood's relationship, the WLR, and the mixture speed of sound, the bulk density and the liquid holdup can be determined. As seen in FIG. 9A, the WLR sensor (910) is used with the measurements from the salinity sensor (904), temperature and static pressure sensors (902) and pure-phase density estimates to determine the liquid phase density (918). These quantities are, in turn, used with a measurement of the apparent mixture density (914) to determine the gas void fraction (916). In some embodiments, the gas void fraction can be directly measured.

Continuing with FIG. 9A, using the above referenced quantities, the mixture density (922), gas volume fraction (924), and total mass and volume flow rates (926) can be determined according to the relationships shown in FIG. 9A given a measurement of the slip ratio from an external sensor. In one or more embodiments, the mixture density (922), gas volume fraction (924), and total volume flow rate (926) are solved according to an iterative procedure (930) such that the equations are self-consistent and properly closed. In other embodiments, these quantities solved simultaneously. Any iterative or simultaneous solver known in the art may be used, including optimization routines, and linear and non-linear systems of equations, without departing from the scope of this disclosure. Finally, with the determined quantities in hand, the individual phase flow rates (928) may be determined according to the relationships depicted in FIG. 9A. Thus, in one or more embodiments, the processes and methods depicted in FIG. 9A allow for an MPFM to be constructed from the speed of sound and bulk velocity measurements (along with a few other sensor measurements (e.g., static pressure, temperature, WLR, etc.)) obtained from the plurality of sensors using the processes of FIG. 6, known correlations, and the physical relationships of EQs. 4-16.

FIG. 9B depicts a method to determine multi-phase flow rates using external sensors to measure the apparent mixture density, total volume flow rate (or total mass rate), and WLR. As shown in FIG. 9B, a plurality of pressure signals is obtained from the plurality of pressure sensors (302). The plurality of pressure signals is passed to a two-dimensional cross-correlation scheme (906) to determine a first time-of-flight and a second time-of-flight. The first time-of-flight corresponds to the time required (or average time) for one or more flow eddies to pass by the plurality of pressure sensors (302). Likewise, the second time-of-flight corresponds to the time required (or the average time) for one or more sound waves to pass by the plurality of pressure sensors (302). Using the first time-of-flight, the second time-of-flight, and the axial spacing, the bulk velocity and mixture speed of sound of the multi-phase fluid are determined. The bulk velocity is used to determine an apparent total volume flow rate (920).

Continuing with FIG. 9B, one or more temperature and dedicated static pressure sensors (902) measure the temperature and pressure of the multi-phase fluid. In other embodiments, one or more of the pressure sensors from the plurality of pressure sensors (302) is used to measure the static pressure of the multi-phase fluid. Additionally, in one or more embodiments, one or more salinity sensors (904) are used to measure the salinity of the water phase in the multi-phase fluid. The pressure, temperature, and salinity values are used with equation of state (EoS) tables (908) to determine the individual densities of the oil, water, and gas in the multi-phase fluid (918). As stated, the pipe is also outfitted with a water-liquid ratio (WLR) sensor (910). The WLR sensor (910) may be of type: gamma-ray attenuation, Coriolis, near-infrared absorption, or other type. In some embodiments, a sensor capable of measuring the water volume fraction, $\alpha_{water}$, is used in lieu of a WLR sensor. In either case, a measurement for the WLR is made. The pressure and temperature sensors (902) are used to select the correct Wood's relationship (912) (e.g., FIG. 8). Using Wood's relationship, the WLR, and the mixture speed of sound, the bulk density and the liquid holdup can be determined. As seen in FIG. 9B, the WLR sensor (910) is used with the measurements from the salinity sensor (904), temperature and static pressure sensors (902) and pure-phase density estimates to determine the liquid phase density (918). These quantities are, in turn, used with a measurement of the apparent mixture density (914) to determine the gas void fraction (916). In some embodiments, the gas void fraction can be directly measured.

Continuing with FIG. 9B, using the above referenced quantities, the mixture density (922) and gas volume fraction (924) can be determined according to the relationships shown in FIG. 9B upon calculating the slip ratio. In one or more embodiments, the slip ratio is calculated according to a correlation. Various correlation are known in the art. In the embodiment of FIG. 9B, the total volume flow rate (or total mass flow rate) (926) is measured with an external sensor. In one or more embodiments, the mixture density (922), gas volume fraction (924), and total volume flow rate (926) are solved according to an iterative procedure (930) such that the equations are self-consistent and properly closed. In other embodiments, these quantities solved simultaneously. Any iterative or simultaneous solver known in the art may be used, including optimization routines, and linear and non-linear systems of equations, without departing from the scope of this disclosure. Finally, with the determined quantities in hand, the individual phase flow rates (928) may be determined according to the relationships depicted in FIG. 9B. Thus, in one or more embodiments, the processes and methods depicted in FIG. 9B allow for an MPFM to be constructed from the speed of sound and bulk velocity measurements (along with a few other sensor measurements (e.g., static pressure, temperature, WLR, etc.)) obtained from the plurality of sensors using the processes of FIG. 6, known correlations, and the physical relationships of EQs. 4-16.

FIG. 9C depicts a method to determine multi-phase flow rates using measurements, from external sensors, of the slip ratio and WLR. As shown in FIG. 9C, a plurality of pressure signals is obtained from the plurality of pressure sensors (302). The plurality of pressure signals is passed to a two-dimensional cross-correlation scheme (906) to determine a first time-of-flight and a second time-of-flight. The first time-of-flight corresponds to the time required (or average time) for one or more flow eddies to pass by the plurality of pressure sensors (302). Likewise, the second time-of-flight corresponds to the time required (or the average time) for one or more sound waves to pass by the plurality of pressure sensors (302). Using the first time-of-flight, the second time-of-flight, and the axial spacing, the bulk velocity and mixture speed of sound of the multi-phase fluid are determined. The bulk velocity is used to determine an apparent total volume flow rate (920).

Continuing with FIG. 9C, one or more temperature and dedicated static pressure sensors (902) measure the temperature and pressure of the multi-phase fluid. In other embodiments, one or more of the pressure sensors from the plurality of pressure sensors (302) is used to measure the static pressure of the multi-phase fluid. Additionally, in one or more embodiments, one or more salinity sensors (904) are used to measure the salinity of the water phase in the multi-phase fluid. The pressure, temperature, and salinity values are used with equation of state (EoS) tables (908) to determine the individual densities of the oil, water, and gas in the multi-phase fluid (918). As stated, the pipe is also outfitted with a water-liquid ratio (WLR) sensor (910). The WLR sensor (910) may be of type: gamma-ray attenuation, Coriolis, near-infrared absorption, or other type. In some embodiments, a sensor capable of measuring the water volume fraction, $\alpha_{water}$, is used in lieu of a WLR sensor. In either case, a measurement for the WLR is made. The pressure and temperature sensors (902) are used to select the correct Wood's relationship (912) (e.g., FIG. 8). Using Wood's relationship, the WLR, and the mixture speed of sound, the bulk density and the liquid holdup can be determined. In contrast to FIGS. 9A and 9B, as seen in FIG. 9C, the apparent mixture density (914) is calculated using the WLR and speed of sound. As seen in FIG. 9C, the WLR sensor (910) is further used with the measurements from the salinity sensor (904), temperature and static pressure sensors (902) and pure-phase density estimates to determine the liquid phase density (918). These quantities are, in turn, used with the apparent mixture density (914) to determine the gas void fraction (916).

Continuing with FIG. 9C, using the above referenced quantities, the mixture density (922), gas volume fraction (924), and total mass and volume flow rates (926) can be determined according to the relationships shown in FIG. 9A given a measurement of the slip ratio. In one or more embodiments, the mixture density (922), gas volume fraction (924), and total volume flow rate (926) are solved according to an iterative procedure (930) such that the equations are self-consistent and properly closed. In other embodiments, these quantities solved simultaneously. Any iterative or simultaneous solver known in the art may be used, including optimization routines, and linear and non-linear systems of equations and associated solvers, without departing from the scope of this disclosure. Finally, with the determined quantities in hand, the individual phase flow rates (928) may be determined according to the relationships depicted in FIG. 9C. Thus, in one or more embodiments, the processes and methods depicted in FIG. 9C allow for an MPFM to be constructed from the speed of sound and bulk velocity measurements (along with a few other sensor measurements (e.g., static pressure, temperature, WLR, etc.)) obtained from the plurality of sensors using the processes of FIG. 6, known correlations, and the physical relationships of EQs. 4-16.

Figure 10:
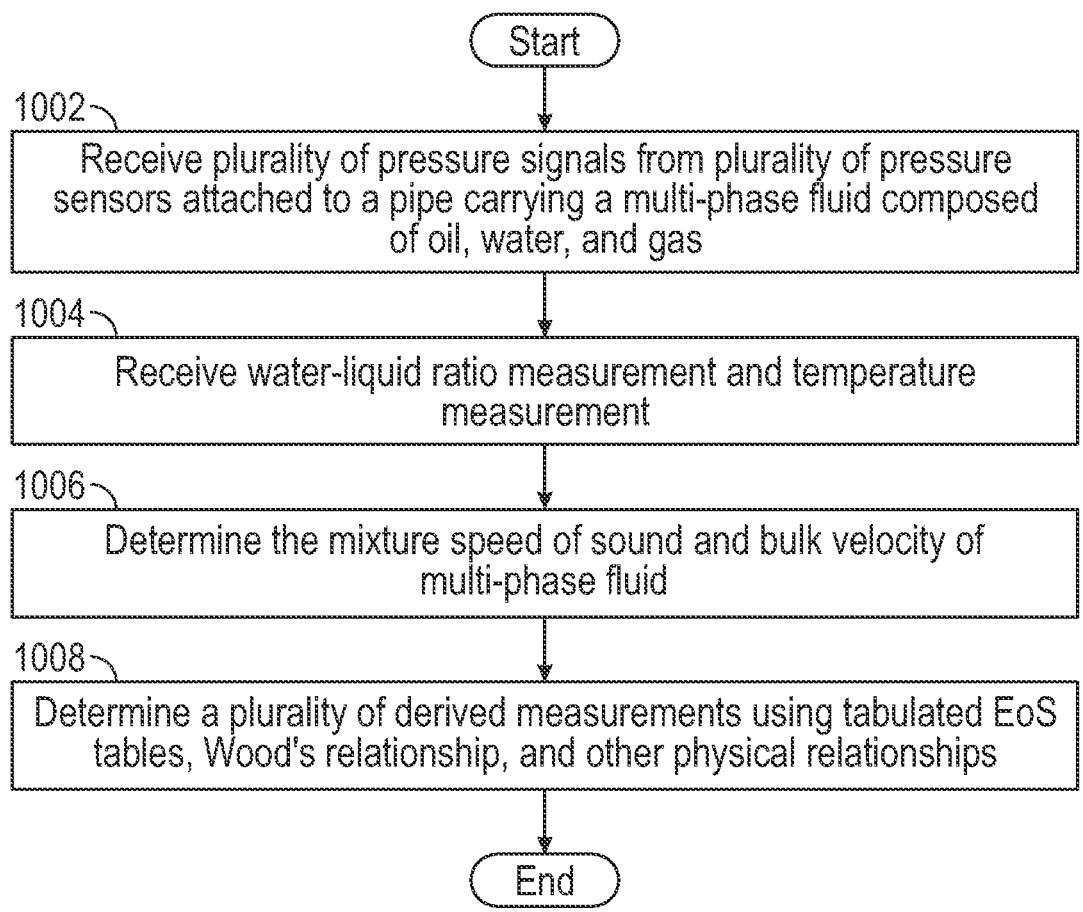
FIG. 10 depicts a flowchart, in accordance with one or more embodiments.

FIG. 10 depicts a flowchart, outlining the steps required to use the plurality of pressure sensors (302) and associated methods disclosed herein to construct a MPFM. In summary, an MPFM measures, or can determine through other measurements, the individual flow rates of its constituents. In Block 1002, a plurality of pressure signals is received from a plurality of pressure sensors (302). There is a one-to-one correspondence between pressure signals and pressure sensors. The pressure sensors are each mounted, or installed in, a pipe carrying a multi-phase fluid composed of oil, water, and gas. In one or more embodiments, the plurality of pressure signals is received by a pressure control system. In Block 1004, a water-liquid ratio measurement is received from a water-liquid ratio sensor disposed near the plurality of pressure sensors (302). Further, a temperature measurement is received from a temperature sensor disposed near the plurality of pressure sensors (302). In Block 1006, the mixture speed of sound and bulk velocity of the multi-phase fluid are determined using a two-dimensional cross-correlation scheme (906) applied to the plurality of pressure signals. In greater detail, Block 1006 encompasses Blocks 604 through 610 of FIG. 6. With the mixture speed of sound, bulk velocity, pressure, temperature, and water-liquid ratio in hand, these quantities can be used with equation of state (EoS) tables, Wood's relationship, and EQs. 4-16 to determine a plurality of derived measurements as shown in Block 1008. In particular, the derived measurements include the individual flow rates for oil, water, and gas effectively creating a MPFM. Additional derived measurements may include, but are not limited to, the slip ratio and volumetric gas fractions.

To demonstrate the utility of the system and methods disclosed herein, a plurality of pressure sensors (302) was installed on a pipe carrying a multi-phase fluid composed of various controlled ratios of oil, water, and gas at a testing facility. The testing facility, further allowed for tailored control of environmental properties such as the temperature and pressure of the fluid as well as the bulk fluid velocity, water-liquid ratio, GVF, mixture density, and salinity levels. Thus, the efficacy of the plurality of pressure sensors (302)

and disclosed methods to use the pressure sensors to determine the bulk velocity and mixture speed of sound a of multi-phase fluid, as well the ability to use these measurements in the construction of a new MPFM was tested. FIGS. 11A-11D depicts some of the results acquired at the testing facility.

Figure 11A:
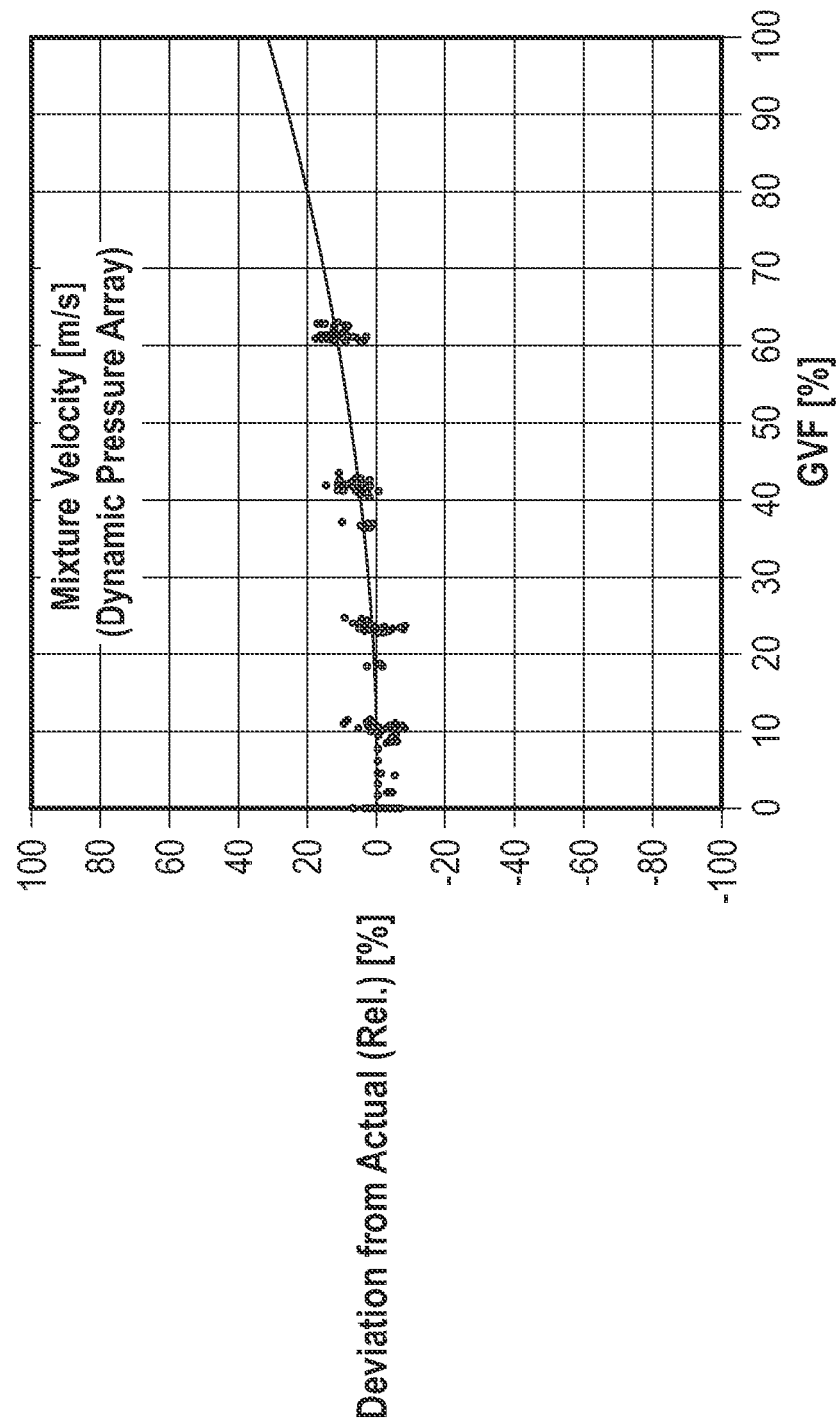
FIG. 11A depicts a plot, in accordance with one or more embodiments.

FIG. 11A depicts the percentage deviation of the bulk velocity determined using the plurality of pressure sensors at various gas volume fractions (GVF). As seen, the plurality of pressure sensors arranged and used according to the methods and processes outlined in this disclosure allow for accurate determination of the mixture velocity.

Figure 11B:
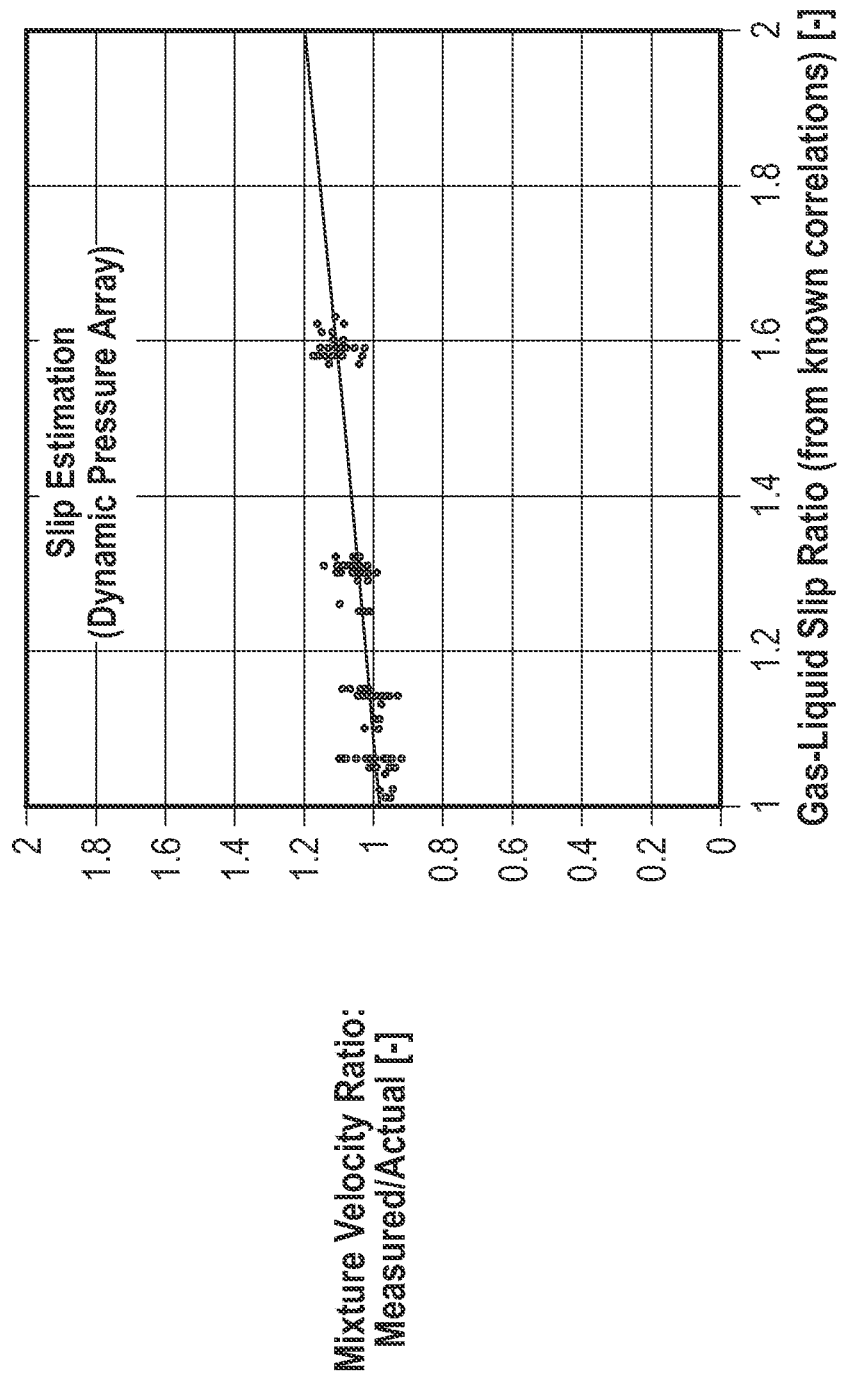
FIG. 11B depicts a plot, in accordance with one or more embodiments.

FIG. 11B depicts how well the methods and systems of the instant disclosure estimate the slip ratio. In FIG. 11B, the y-axis is the ratio of measured velocity (according to the processes and methods disclosed herein) to the true (i.e., known) mixture-velocity that is known from the testing facility. The x-axis of FIG. 11B is from Chisholm's slip correlation. Chisholm slip correlation is technically applicable only for high-GVF/wet-gas flows, but its general form is applicable for the entire multiphase flow (i.e., all GVFs). Hence it is being used here to illustrate that the plurality of pressure sensors used according to methods of the instant disclosure (i.e., mixture velocity measurement) correlates well with expected slip ratio.

Figure 11C:
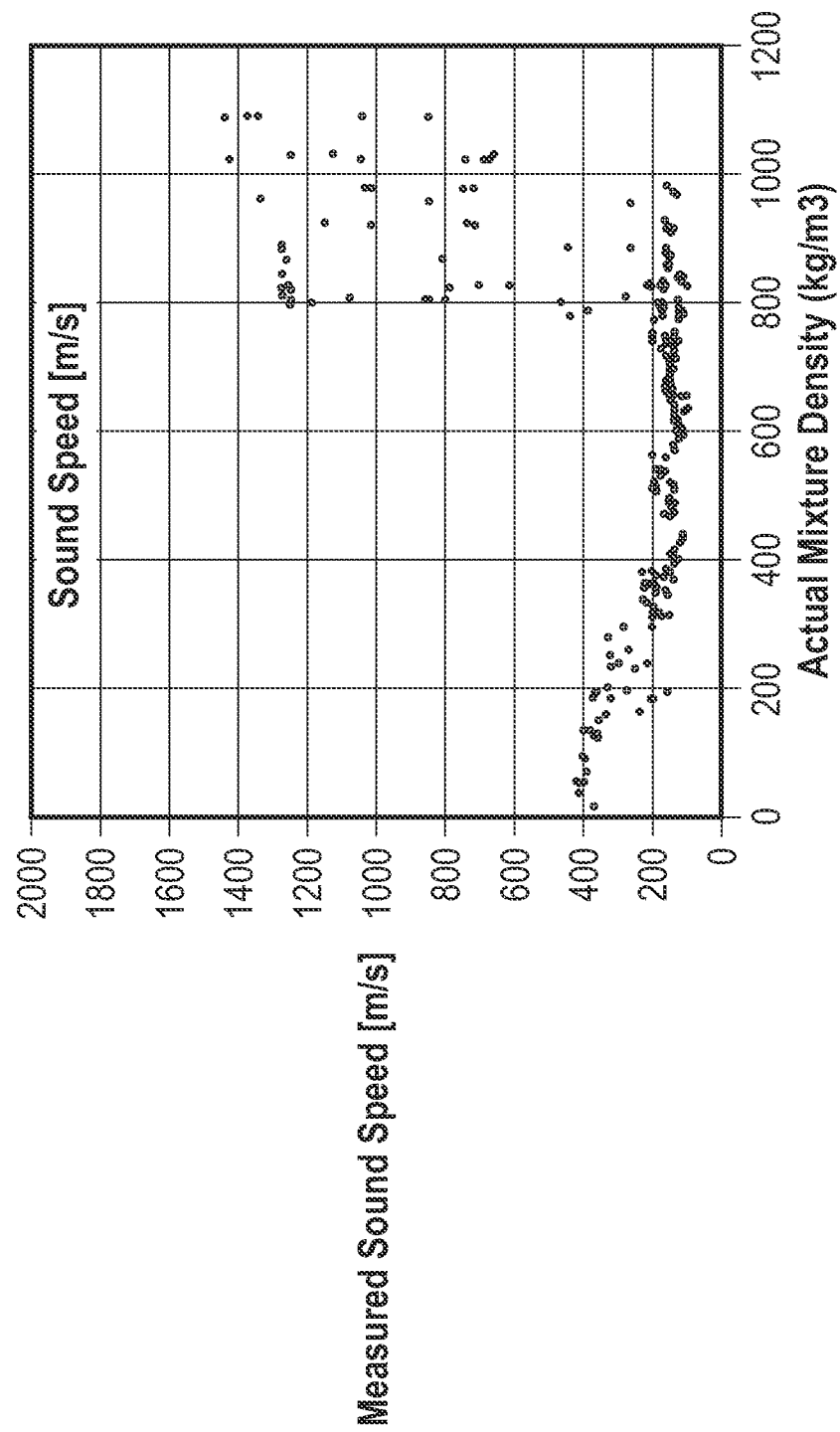
FIG. 11C depicts a plot, in accordance with one or more embodiments.
Figure 11D:
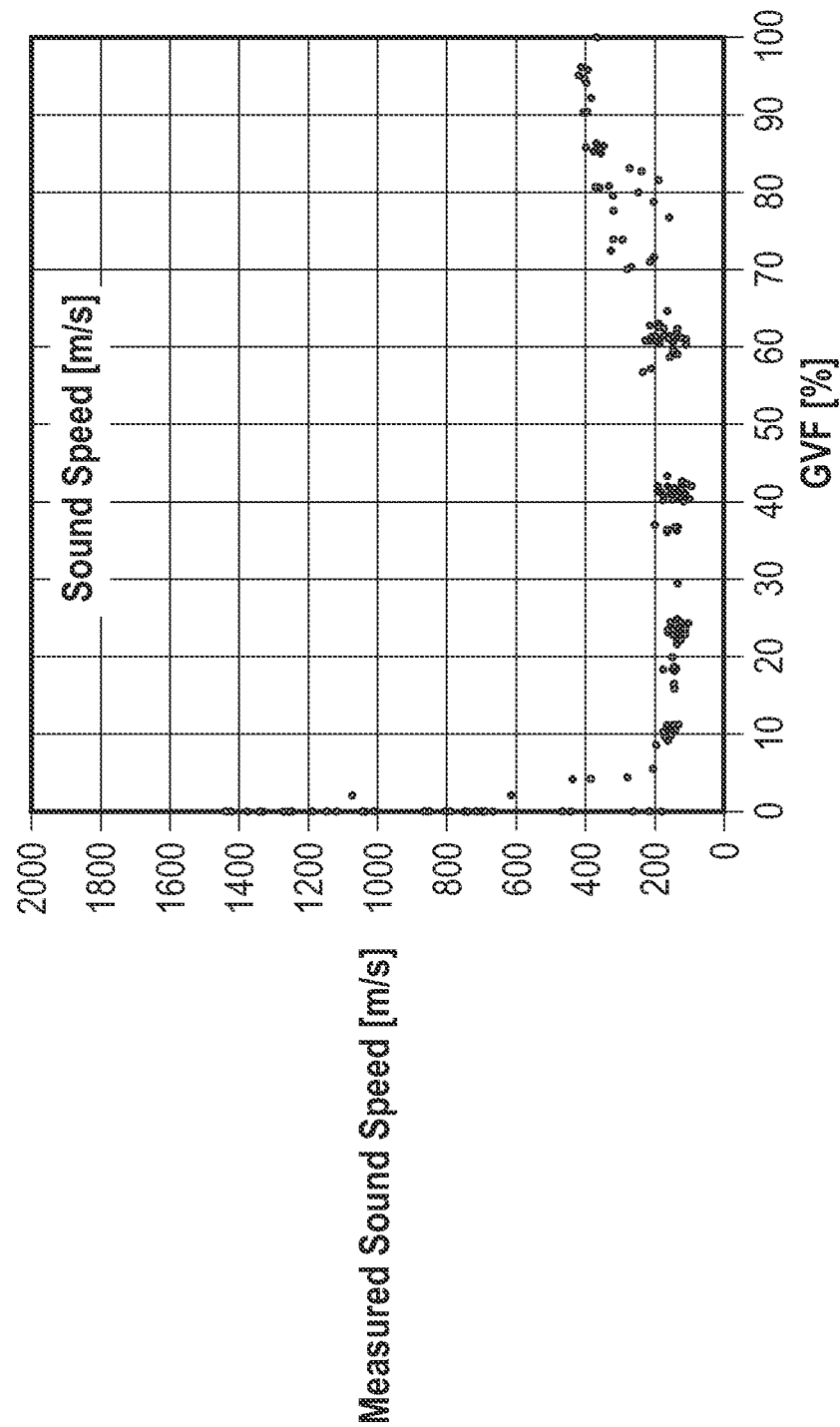
FIG. 11D depicts a plot, in accordance with one or more embodiments.

FIG. 11C depicts the measured speed of sound determined according to the systems and methods of the instant disclosure for various mixture densities. FIG. 11D depicts the measured speed of sound determined according to the systems and methods of the instant disclosure at various gas volume fractions (GVF). As seen in these figures the measurement of speed of sound has increased variance at high densities (low gas volume fractions, at least for the indicated tests. It is hypothesized that some residual gas remained in the test-section of the flowline (i.e., trapped gas that was intended to be flushed from the system but was not actually removed) and/or gas originated from the oil (as the pressure dropped in the test-section) due to various bends and area reductions leading up to the test-section. As such, indications of increased variance are likely an artifact of the testing procedure and facility, or other physical phenomena, and not indicative of poor measurement quality of the disclosed system. FIGS. 11C and 11D are diagnostic/exploratory graphs that demonstrate that the general contours of the measured speed of sound is similar to the curves/contours from the ideal/Wood's equations. FIG. 11D additionally demonstrates that the speed of sound is sensitive to GVF (and hence more useful as a gas-fraction-measuring parameter) at low- and high-GVFs, but not at mid-GVF where the trend is relatively flat.

One with ordinary skill in the art will recognize that many alterations can be readily applied to the system and methods disclosed herein. Select alterations are discussed below. Any of these alterations, or combinations thereof, can be employed as alternate embodiments without departing from the scope of this disclosure. For example, in one or more embodiments, two or more pressure sensors can be placed at the same axial location to improve the signal-to-noise ratio. In one or more embodiments, two pressure sensors are installed at each axial location such that the plurality of pressure sensors is arranged in a double-helical pattern. In one or more embodiments, the system and methods disclosed herein can be realized as a wet-gas meter when combined, for example, with a differential pressure sensor. In other embodiments, algorithms are employed to correct for the effect of pipe flexure (e.g., depending on pipe material, say, PVC vs. metal). In other embodiments, a plurality of differential dynamic pressure sensors is used, where each dynamic pressure sensor is between a pair of pressure taps (instead of a single pressure sensor at each pressure tap as previously described in this disclosure). In one or more embodiments, upstream flow conditioning (such as entrance/development length, static mixers, helical pipes, slotted plates, nozzles or Venturi-type piping, etc.), may be added to the pipe to homogenize the flow (and thus improve quality of data, accuracy of measurement). Finally, in one or more embodiments, a bluff-body vortex generator and/or acoustic source (e.g., V-cone, tuning fork) may be installed upstream to generate strong and known sound waves in order to enhance signal quality.

Embodiments of the present disclosure may provide at least one of the following advantages. The system has no moving parts and is non-intrusive, resulting in hardware reliability (which is advantageous for field implementation). The plurality of pressure sensors is full-bore, resulting in negligible pressure-drop across the sensors. In the most common situation, the pressure sensors are installed with threaded (e.g., NPT) connections, yielding easy serviceability/maintenance. The system is not dependent on profile, size, or thickness of the fluid-carrying conduit. The plurality of pressure sensors allows for a direct measurement of flow pressure because the diaphragms are in contact with the fluid. Whereas, for example, strain gauge based sensors suffer from dilution/distortion of the pressure signal due to transfer-function of the conduits mechanical/vibrational properties (which could change with other factors such as temperature). Further, in systems with strain gauge based sensors, the entire pipe is known to expand and/or contract which may result in crosstalk between adjacent sensors, thus reducing signal-to-noise ratio. Additionally, the expansion and contraction of the pipe may limit how close the strain gauges can be installed next to each other, thus reducing spatial resolution. Embodiments disclosed herein, through a direct measurement of flow pressure with flush-mounted sensors overcomes both these issues, especially when the plurality of pressure sensors is arranged helically according to one or more embodiments of the instant disclosure. Finally, embodiments disclosed herein allow for a cheaper, simpler, and potentially more robust MPFM.

Figure 12:
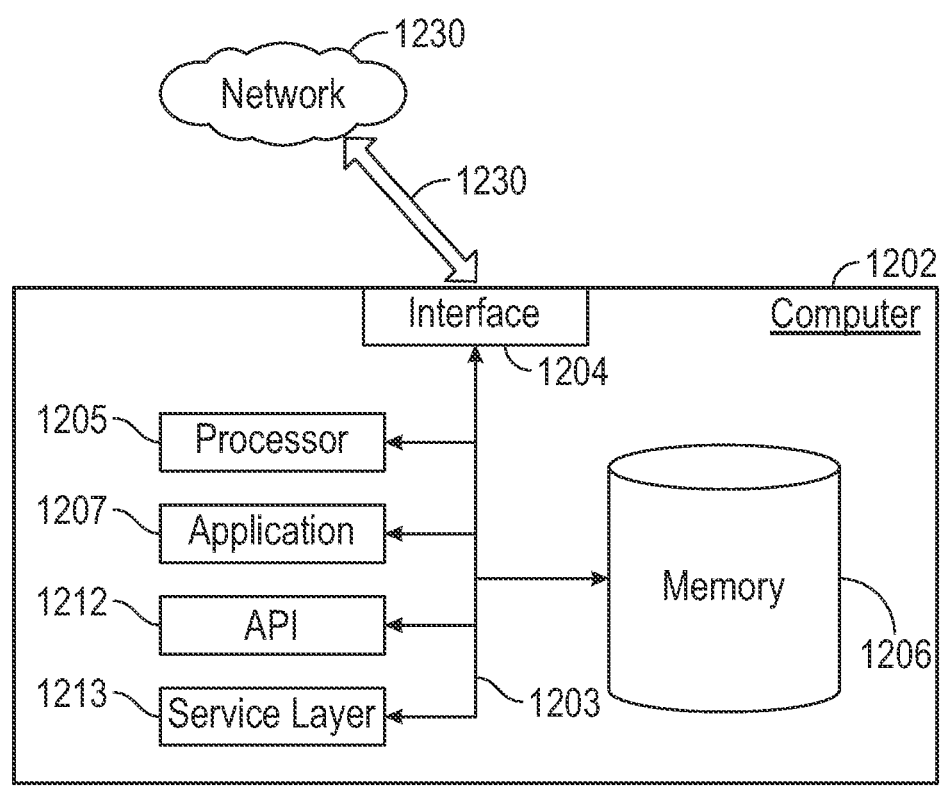
FIG. 12 depicts a system, in accordance with one or more embodiments.

FIG. 12 further depicts a block diagram of a computer system (1202) (e.g., the pressure control system) used to provide computational functionalities associated with the methods, functions, processes, flows, and procedures as described in this disclosure, according to one or more embodiments. The illustrated computer (1202) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1202) may include a computer that includes an input device, such as a keypad, keyboard, touch screen, or other device that can accept user information, and an output device that conveys information associated with the operation of the computer (1202), including digital data, visual, or audio information (or a combination of information), or a GUI.

The computer (1202) can serve in a role as a client, network component, a server, a database or other persistency, or any other component (or a combination of roles) of a computer system for performing the subject matter described in the instant disclosure. In some implementations, one or more components of the computer (1202) may be configured to operate within environments, including cloud-computing-based, local, global, or other environment (or a combination of environments).

At a high level, the computer (1202) is an electronic computing device operable to receive, transmit, process, store, or manage data and information associated with the described subject matter. According to some implementations, the computer (1202) may also include or be communicably coupled with an application server, e-mail server, web server, caching server, streaming data server, business intelligence (BI) server, or other server (or a combination of servers).

The computer (1202) can receive requests over network (1230) from a client application (for example, executing on another computer (1202) and responding to the received requests by processing the said requests in an appropriate software application. In addition, requests may also be sent to the computer (1202) from internal users (for example, from a command console or by other appropriate access method), external or third-parties, other automated applications, as well as any other appropriate entities, individuals, systems, or computers.

Each of the components of the computer (1202) can communicate using a system bus (1203). In some implementations, any or all of the components of the computer (1202), both hardware or software (or a combination of hardware and software), may interface with each other or the interface (1204) (or a combination of both) over the system bus (1203) using an application programming interface (API) (1212) or a service layer (1213) (or a combination of the API (1212) and service layer (1213). The API (1212) may include specifications for routines, data structures, and object classes. The API (1212) may be either computer-language independent or dependent and refer to a complete interface, a single function, or even a set of APIs. The service layer (1213) provides software services to the computer (1202) or other components (whether or not illustrated) that are communicably coupled to the computer (1202). The functionality of the computer (1202) may be accessible for all service consumers using this service layer. Software services, such as those provided by the service layer (1213), provide reusable, defined business functionalities through a defined interface. For example, the interface may be software written in JAVA, C++, or other suitable language providing data in extensible markup language (XML) format or another suitable format. While illustrated as an integrated component of the computer (1202), alternative implementations may illustrate the API (1212) or the service layer (1213) as stand-alone components in relation to other components of the computer (1202) or other components (whether or not illustrated) that are communicably coupled to the computer (1202). Moreover, any or all parts of the API (1212) or the service layer (1213) may be implemented as child or sub-modules of another software module, enterprise application, or hardware module without departing from the scope of this disclosure.

The computer (1202) includes an interface (1204). Although illustrated as a single interface (1204) in FIG. 12, two or more interfaces (1204) may be used according to particular needs, desires, or particular implementations of the computer (1202). The interface (1204) is used by the computer (1202) for communicating with other systems in a distributed environment that are connected to the network (1230). Generally, the interface (1204) includes logic encoded in software or hardware (or a combination of software and hardware) and operable to communicate with the network (1230). More specifically, the interface (1204) may include software supporting one or more communication protocols associated with communications such that the network (1230) or interface's hardware is operable to communicate physical signals within and outside of the illustrated computer (1202).

The computer (1202) includes at least one computer processor (1205). Although illustrated as a single computer processor (1205) in FIG. 12, two or more processors may be used according to particular needs, desires, or particular implementations of the computer (1202). Generally, the computer processor (1205) executes instructions and manipulates data to perform the operations of the computer (1202) and any algorithms, methods, functions, processes, flows, and procedures as described in the instant disclosure.

The computer (1202) also includes a memory (1206) that holds data for the computer (1202) or other components (or a combination of both) that can be connected to the network (1230). The memory may be a non-transitory computer readable medium. For example, memory (1206) can be a database storing data consistent with this disclosure. Although illustrated as a single memory (1206) in FIG. 12, two or more memories may be used according to particular needs, desires, or particular implementations of the computer (1202) and the described functionality. While memory (1206) is illustrated as an integral component of the computer (1202), in alternative implementations, memory (1206) can be external to the computer (1202).

The application (1207) is an algorithmic software engine providing functionality according to particular needs, desires, or particular implementations of the computer (1202), particularly with respect to functionality described in this disclosure. For example, application (1207) can serve as one or more components, modules, applications, etc. Further, although illustrated as a single application (1207), the application (1207) may be implemented as multiple applications (1207) on the computer (1202). In addition, although illustrated as integral to the computer (1202), in alternative implementations, the application (1207) can be external to the computer (1202).

There may be any number of computers (1202) associated with, or external to, a computer system containing computer (1202), wherein each computer (1202) communicates over network (1230). Further, the term "client," "user," and other appropriate terminology may be used interchangeably as appropriate without departing from the scope of this disclosure. Moreover, this disclosure contemplates that many users may use one computer (1202), or that one user may use multiple computers (1202).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method, comprising the steps:
    obtaining a plurality of pressure signals from a plurality of pressure sensors that are helically disposed about a pipe that conveys a multi-phase fluid, the plurality of pressure sensors having both a non-zero angular and a non-zero axial spacing, wherein each pressure sensor in the plurality of pressure sensors comprises a diaphragm for sensing pressure, wherein the diaphragm of each pressure sensor is aligned with an inner wall of the pipe such that each pressure sensor is flush-mounted on the inner wall of the pipe;

classifying, using the plurality of pressure signals, a first pressure event as a flow eddie and classifying, using the plurality of pressure signals, a second pressure event as a sound wave, wherein a time scale of the sound wave is shorter than a time scale of the flow eddie;

determining, using the plurality of pressure signals, a first time-of-flight corresponding to the first pressure event;

determining, using the plurality of pressure signals, a second time-of-flight corresponding to the second pressure event;

determining, using the first time-of-flight, a bulk velocity of the multi-phase fluid;

determining, using the second time-of-flight, a velocity of the sound wave;

determining, a direction of the second pressure event relative to the first pressure event;

determining, using the bulk velocity and the second time-of-flight, a mixture speed of sound of the multi-phase fluid by biasing the velocity of the sound wave with the bulk velocity based on the direction;

obtaining, with a temperature sensor disposed on the pipe, a temperature of the multi-phase fluid;

obtaining, with a salinity sensor disposed on the pipe, a salinity of the multi-phase fluid;

obtaining, with a water-liquid ratio sensor disposed on the pipe, a water-liquid ratio of the multi-phase fluid;

determining, using a pressure and the temperature of the multi-phase fluid, the mixture speed of sound, and the water-liquid ratio, an apparent mixture density of the multiphase fluid;

determining, using the salinity, the pressure, and the temperature, phase densities for oil, water, and gas in the multi-phase fluid; and determining the flow rate of oil, water, and gas in the multi-phase fluid based on the apparent mixture density, the phase densities for oil, water, and gas, and the bulk velocity.

2. The method of claim 1, further comprising:
determining a derived measurement based, at least in part, on the bulk velocity, the mixture speed of sound, and the water-liquid ratio measurement.

3. The method of claim 2, wherein the derived measurement is one of: total flow rate, gas-liquid slip, gas phase fraction, liquid phase fraction.

4. The method of claim 1, wherein the axial spacing has a first spacing and the angular spacing has a second spacing.

5. The method of claim 4, wherein the first time-of-flight and the second time-of-flight are determined using a two-dimensional cross-correlation scheme operating on the plurality of pressure signals.

6. The method of claim 5, wherein the two-dimensional cross-correlation scheme uses a two-dimensional Fourier transform.

7. A system, comprising:
a pipe in a pipeline that conveys a multi-phase fluid;
a plurality of pressure sensors helically disposed on the pipe having both a non-zero angular and a non-zero axial spacing;
a pressure control system, comprising:
one or more processors, and
a non-transitory computer-readable memory comprising computer-executable instructions stored thereon that, when executed on the one or more processors, cause the processor to perform:
obtaining a plurality of pressure signals from the plurality of pressure sensors;

classifying, using the plurality of pressure signals, a first pressure event as a flow eddie and classifying, using the plurality of pressure signals, a second pressure event as a sound wave, wherein a time scale of the sound wave is shorter than a time scale of the flow eddie;

determining, using the plurality of pressure signals, a first time-of-flight corresponding to the first pressure event;

determining, using the plurality of pressure signals, a second time-of-flight corresponding to the second pressure event;

determining, using the first time-of-flight, a bulk velocity of the multi-phase fluid;

determining, using the second time-of-flight, a velocity of the sound wave;

determining, a direction of the second pressure event relative to the first pressure event; and determining, using the bulk velocity and the second time-of-flight, a speed of sound of the multi-phase fluid by biasing the velocity of the sound wave with the bulk velocity based on the direction;

obtaining, with a temperature sensor disposed on the pipe, a temperature of the multi-phase fluid;

obtaining, with a salinity sensor disposed on the pipe, a salinity of the multi-phase fluid;

obtaining, with a water-liquid ratio sensor disposed on the pipe, a water-liquid ratio of the multi-phase fluid;

determining, using a pressure and the temperature of the multi-phase fluid, the mixture speed of sound, and the water-liquid ratio, an apparent mixture density of the multiphase fluid using Wood's relationship;

determining, using the salinity, the pressure, and the temperature, phase densities for oil, water, and gas in the multi-phase fluid; and determining the flow rate of oil, water, and gas in the multi-phase fluid based on the apparent mixture density, the phase densities for oil, water, and gas, and the bulk velocity;

wherein each pressure sensor in the plurality of pressure sensors comprises a diaphragm for sensing pressure; and wherein the diaphragm of each pressure sensor is aligned with an inner wall of the pipe such that each pressure sensor is flush-mounted on the inner wall of the pipe.

8. The system of claim 7, wherein the angular spacing of the plurality of pressure sensors is uniform.

9. The system of claim 7, wherein the axial spacing of the plurality of pressure sensors is uniform.

10. The system of claim 7, wherein each pressure sensor in the plurality of pressure sensors is a dynamic pressure sensor.

11. The system of claim 7, further comprising:
a bluff-body vortex generator disposed on the pipe, wherein the bluff-body vortex generator is located upstream from the plurality of pressure sensors.

12. A non-transitory computer-readable memory comprising computer-executable instructions stored thereon that, when executed on a processor, cause the processor to perform:
obtaining a plurality of pressure signals from a plurality of pressure sensors that are helically disposed about a pipe having both a non-zero angular and a non-zero axial spacing;

classifying, using the plurality of pressure signals, a first pressure event as a flow eddie and classifying, using the plurality of pressure signals, a second pressure event as a sound wave, wherein a time scale of the sound wave is shorter than a time scale of the flow eddie;

determining, using the plurality of pressure signals, a first time-of-flight corresponding to the first pressure event;

determining, using the plurality of pressure signals, a second time-of-flight corresponding to the second pressure event;

determining, using the first time-of-flight, a bulk velocity of a multi-phase fluid flowing in a pipe in a pipeline;

determining, using the second time-of-flight, a velocity of the sound wave;

determining, a direction of the second pressure event relative to the first pressure event;

determining, using the bulk flow velocity and the second time-of-flight, a speed of sound of the multi-phase fluid by biasing the velocity of the sound wave with the bulk velocity based on the direction;

obtaining, with a temperature sensor disposed on the pipe, a temperature of the multi-phase fluid;

obtaining, with a salinity sensor disposed on the pipe, a salinity of the multi-phase fluid;

obtaining, with a water-liquid ratio sensor disposed on the pipe, a water-liquid ratio of the multi-phase fluid;

determining, using a pressure and the temperature of the multi-phase fluid, the mixture speed of sound, and the water-liquid ratio, an apparent mixture density of the multiphase fluid using Wood's relationship;

determining, using the salinity, the pressure, and the temperature, phase densities for oil, water, and gas in the multi-phase fluid; and determining the flow rate of oil, water, and gas in the multi-phase fluid based on the apparent mixture density, the phase densities for oil, water, and gas, and the bulk velocity.

13. The non-transitory computer-readable memory of claim 12, further comprising computer-executable instructions that when executed on the processor cause the processor to perform:

determining a derived measurement based, at least in part, on the bulk velocity, the speed of sound, and the water-liquid ratio measurement.

14. The non-transitory computer-readable memory of claim 13, wherein the derived measurement is one of: total flow rate, gas-liquid slip, gas phase fraction, liquid phase fraction.

15. The non-transitory computer-readable memory of claim 12, wherein a spatial location of each pressure sensor in the plurality of pressure sensors is known.

16. The non-transitory computer-readable memory of claim 15, wherein the first time-of-flight and the second time-of-flight are determined using a two-dimensional cross-correlation scheme operating on the plurality of pressure signals.

17. The non-transitory computer-readable memory of claim 12, wherein the one or more sound wave originates from one or more flow-induced acoustic sources in the pipeline.

* * * * *